United States Patent [19]

Christensen

[11] 4,141,201
[45] Feb. 27, 1979

[54] APPARATUS FOR CUTTING TOPS FROM PLANTS

[76] Inventor: Steven H. Christensen, 803 E. Melody Dr., Gilbert, Ariz. 85234

[21] Appl. No.: 762,256

[22] Filed: Jan. 26, 1977

Related U.S. Application Data

[63] Continuation-in-part of Ser. No. 594,225, Jul. 9, 1975, abandoned.

[51] Int. Cl.² .......................................... A01D 23/04
[52] U.S. Cl. ............................... 56/121.42; 56/327 R
[58] Field of Search ............. 56/121.4, 121.42, 121.46, 56/14.4, 364, 327 R, 327 A, 15.8, 17.2, 12.1; 171/42, 26, 29, 31, 32, 34, 41

[56] References Cited

U.S. PATENT DOCUMENTS

| 1,258,456 | 3/1918 | Pulver et al. ....................... 56/121.42 |
| 1,748,745 | 2/1930 | Zuckerman ............................. 171/42 |
| 2,314,681 | 3/1943 | Beatty ................................. 56/121.42 |
| 2,358,400 | 9/1944 | Kiest ................................... 56/121.42 |
| 3,143,839 | 8/1964 | Johnson ................................. 56/14.4 |
| 3,302,727 | 2/1967 | Ray ........................................ 171/42 |
| 3,353,342 | 11/1967 | Hill et al. ........................... 56/327 R |
| 3,597,909 | 8/1971 | Laurdsen, Sr. et al. ........... 56/327 R |
| 3,603,404 | 9/1971 | Whitsed ............................. 56/121.46 |
| 3,921,375 | 11/1975 | Cetrulo, Jr. ........................ 56/327 R |

FOREIGN PATENT DOCUMENTS

| 400270 | 3/1974 | U.S.S.R. ................................... 56/12.1 |
| 437504 | 12/1974 | U.S.S.R. ................................... 56/12.1 |

Primary Examiner—Russell R. Kinsey
Assistant Examiner—Paul J. Hirsch
Attorney, Agent, or Firm—H. Gordon Shields

[57] ABSTRACT

Apparatus for removing the tops of plants, such as onions, prior to the harvesting of the plants is disclosed which includes a fixed or main frame secured to a tractor and a floating frame secured to the fixed frame and movable with respect thereto. The floating frame includes rotating fingers for lifting the top and a rotating cutter blade for cutting the tops.

34 Claims, 18 Drawing Figures

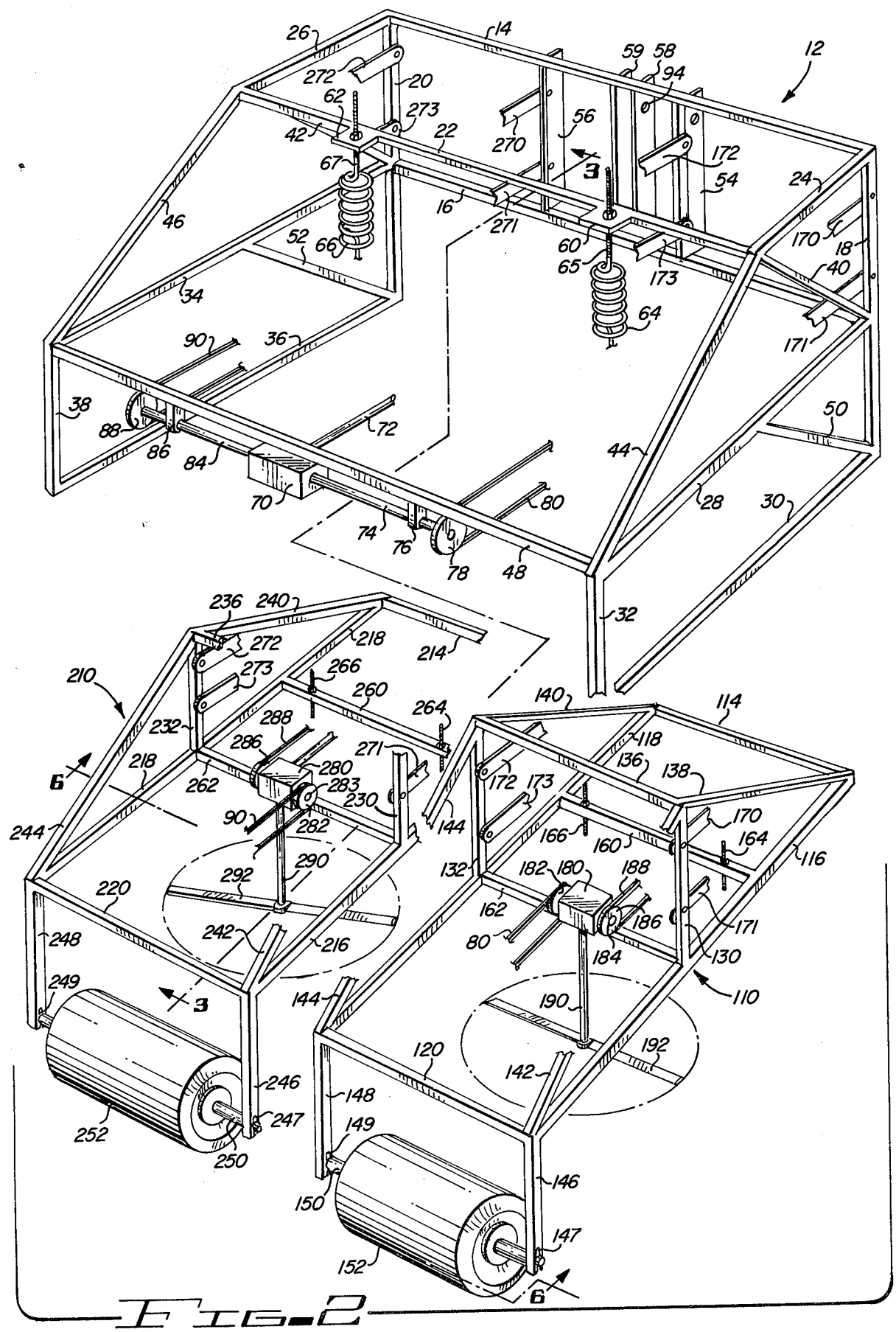

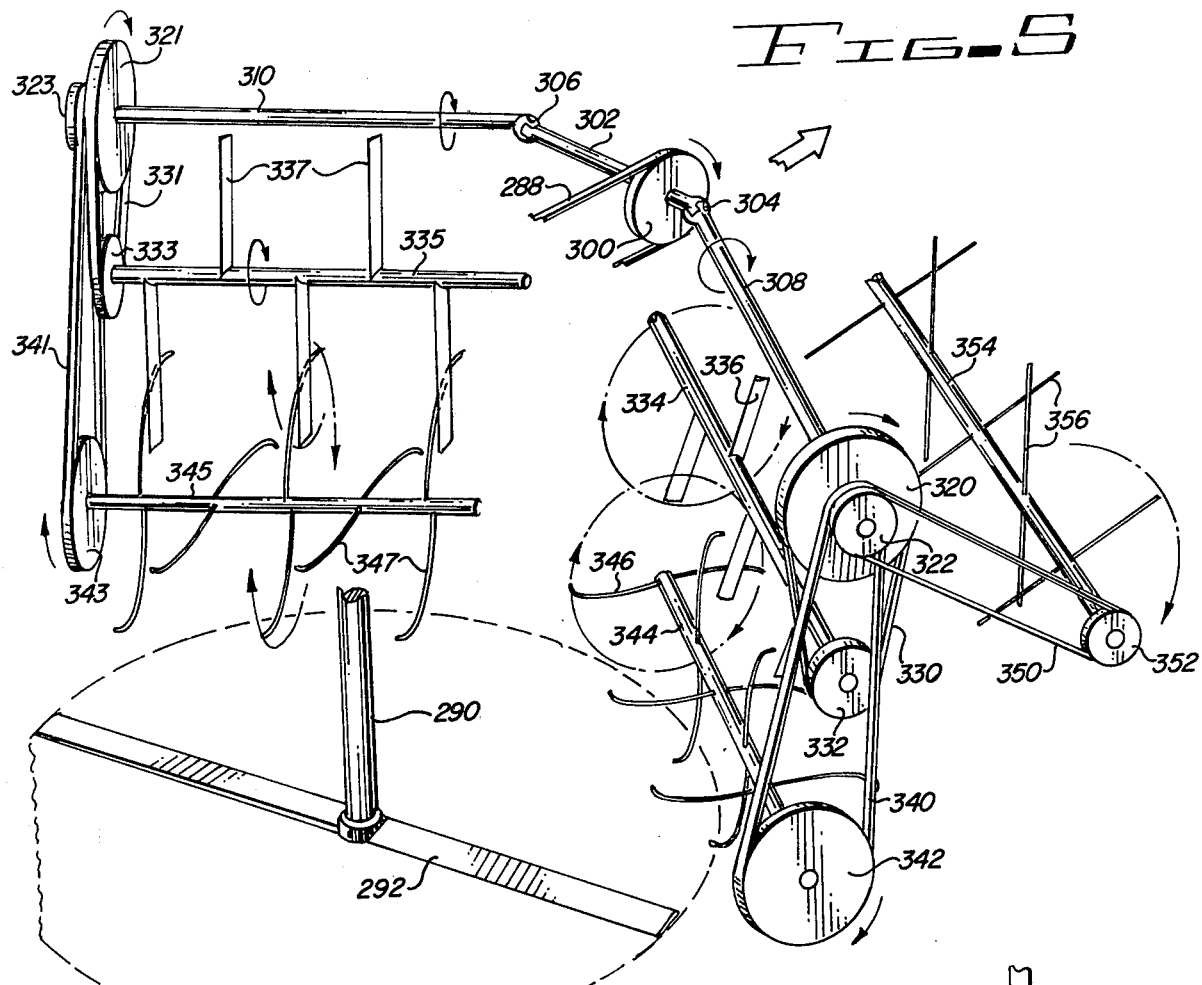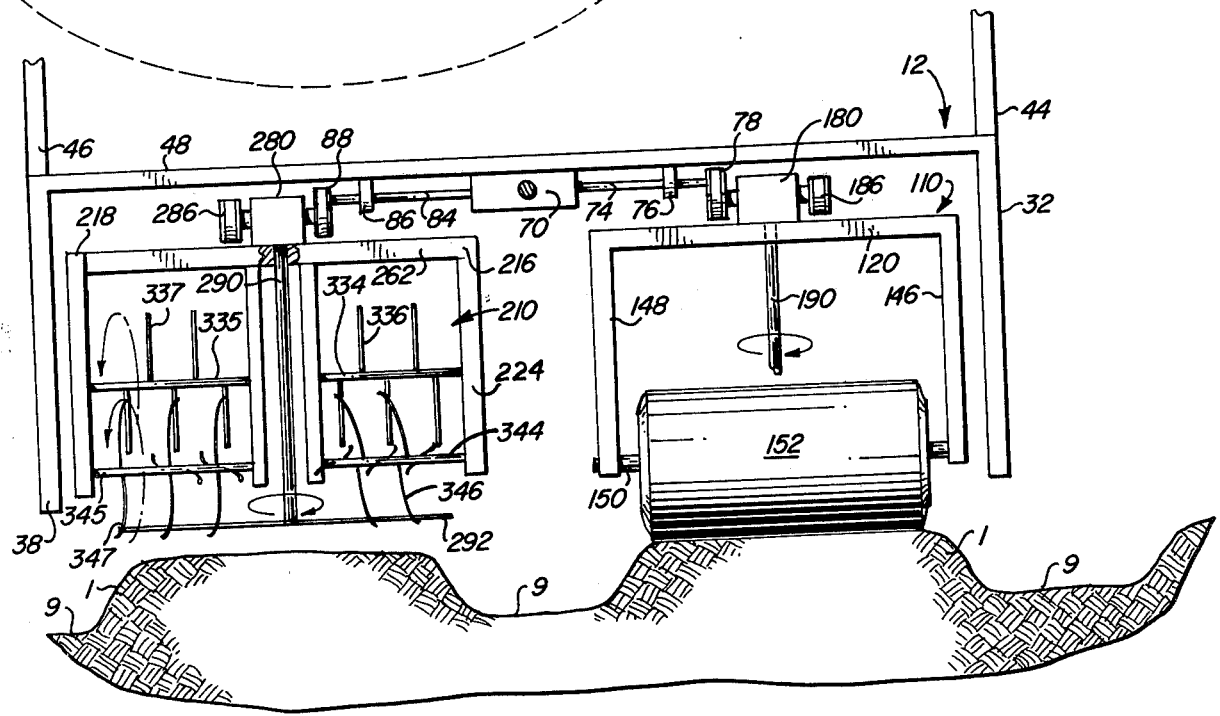

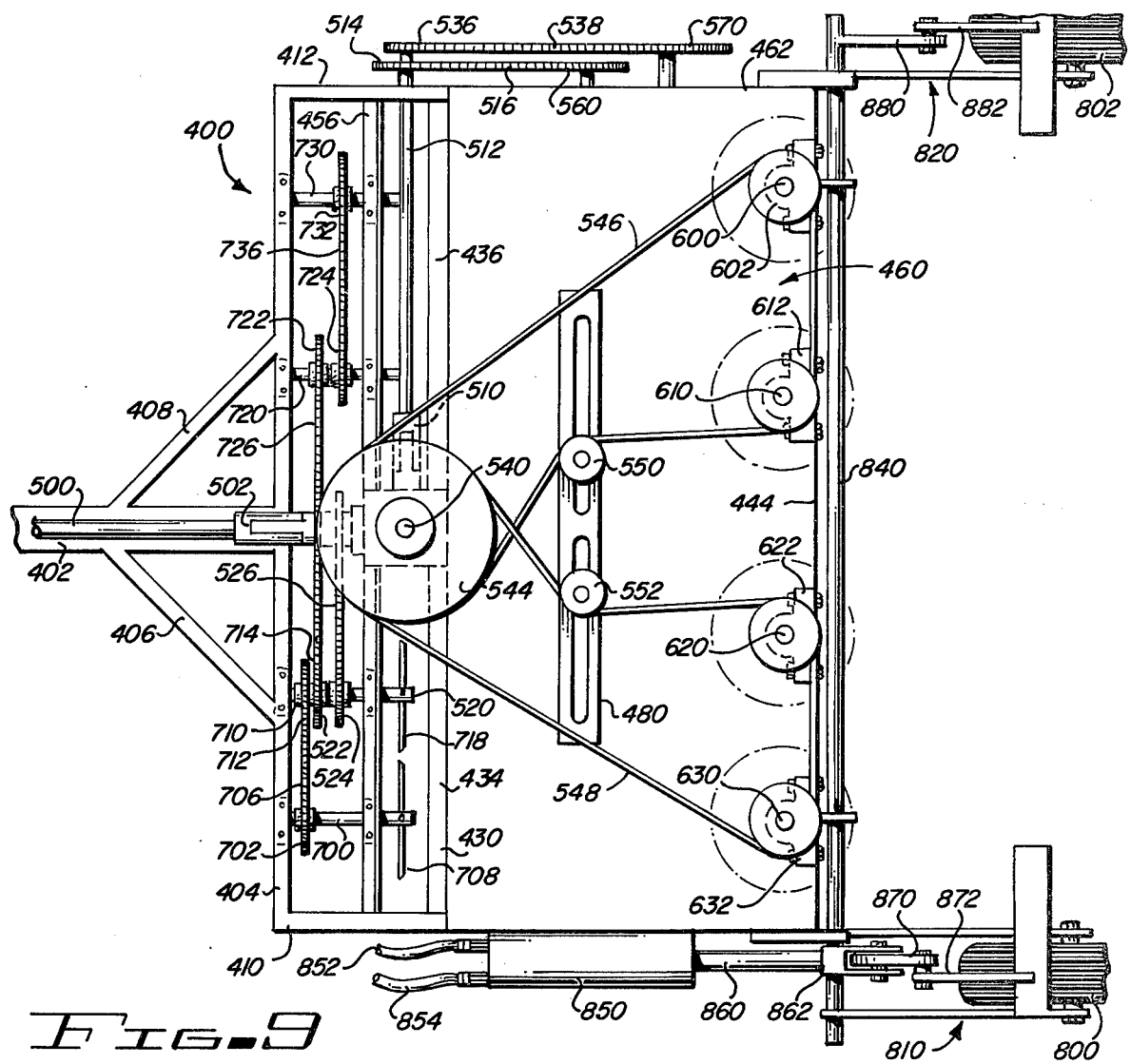
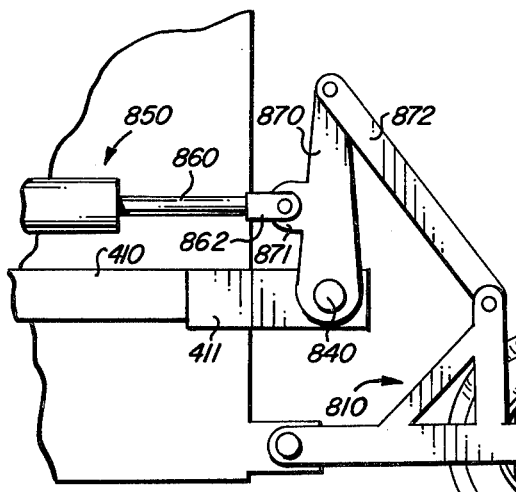
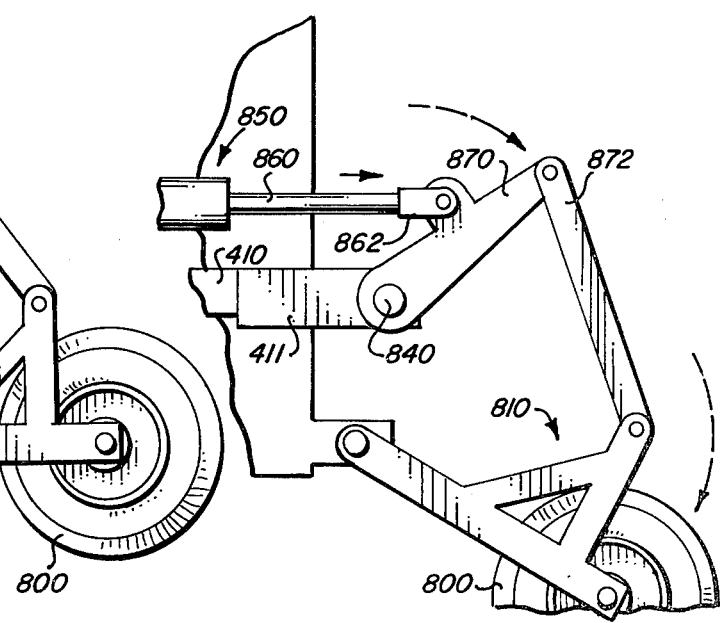

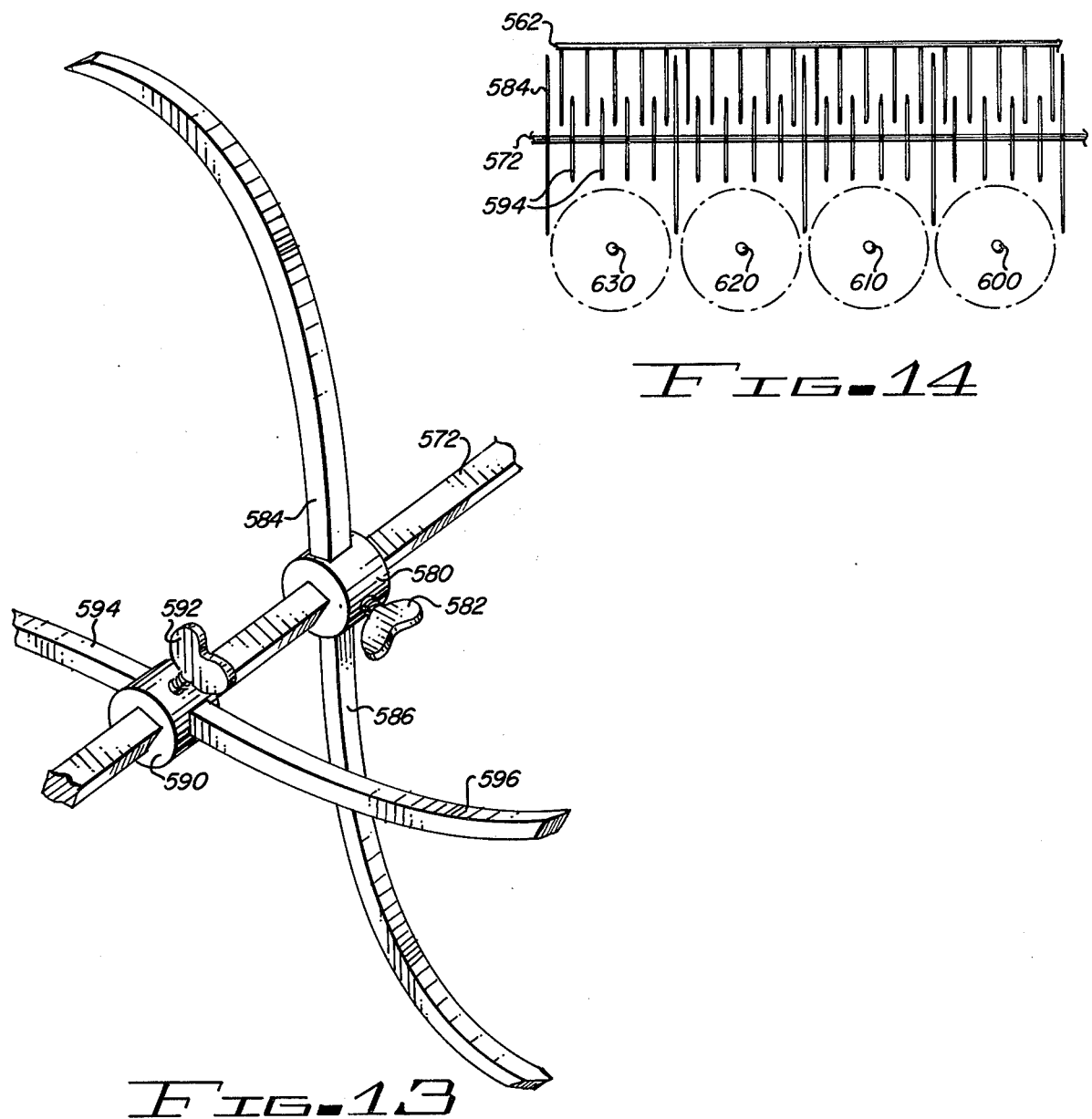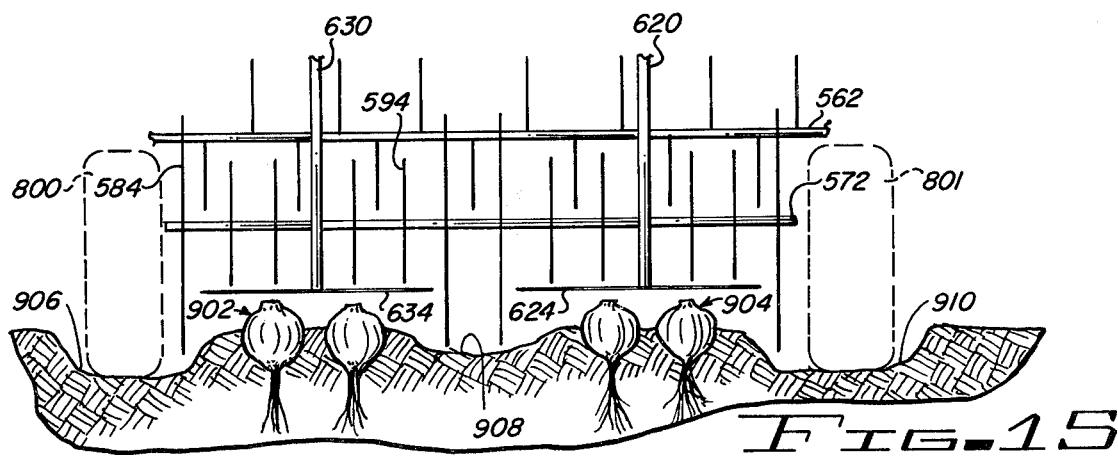

APPARATUS FOR CUTTING TOPS FROM PLANTS

CROSS-REFERENCE TO RELATED APPLICATION

This is a continuation-in-part of copending application, Ser. No. 594,225, filed July 9, 1975 now abandoned.

BACKGROUND OF THE INVENTION

1. Field of the Invention:

This invention relates to a method and apparatus for removing the tops of plants prior to harvesting and, more particularly, to apparatus which lifts the tops and positions the tops for cutting by a cutter blade.

2. Description of the Prior Art:

The method and apparatus described herein is particularly adapted to removing the tops of onion plants. An onion is a biennial herbaceous plant with long, tubulated leaves and a pithy stalk. The stalk and leaves grow upwardly from a bulbous portion which grows partially above the top of the soil. The root structure of onions comprises a multiplicity of segments growing into the soil from the lower portion of the bulb. The individual segments extend outwardly and downwardly and anchor the bulb to the soil and, of course, provide for the intake of nutrients for the onion.

Onions typically grow in beds with single or multiple rows between furrows, depending on local farming or cultural practices. In some areas, onions grow adjacent each other, without clearly defined rows, and are accordingly relatively dense in a bed.

About a week prior to harvesting the onions in some areas, the tops, or the stalk and leaf portion of the onion plants, are rolled or bent in one direction as part of the pre-harvest processing. The rolling of the tops prevents any new growth from occurring in the onion plants and helps dry out the neck of the onion. These processes are of significance with respect to the actual harvesting of the onions, and the bent tops must be considered during a mechanical "topping operation".

In other areas, rolling is not accomplished, but the tops, or some of the tops, are bent over for various reasons, such as their own weight or pressure caused by wind. Accordingly, some of the tops, even without rolling, are bent and require particular handling during the cutting or topping process.

While various types of apparatus are used to "top" various growing plants, such as sugar beets, the prior art does not include apparatus for topping onion plants. In most prior art apparatus used for topping plants, a single plant is topped by itself. The apparatus generally includes means for guiding the plant top into a pair of blades which severs the tops and the apparatus also generally includes some means for rejecting the cut tops away from the root of the plant. In such situations, the plants to be topped are generally aligned in a row singly and spaced apart. Accordingly, only a single plant is usually topped at any one time. In other situations, flails are used to hack or tear tops from plants. Regardless of the specific method or apparatus used, it is usually of little concern whether or not the edible or consumable portion of the plant, such as the root or bulb, is bruised or nicked or cut in the topping operation.

With respect to the growth of onions, the plants grow adjacent each other in relatively thick profusion along a bed, typically about twenty-four inches wide, as illustrated herein. The individual plants are shown generally adjacent each other such that the top of the bed resembles an old-time cobblestone road. That is, the bed resembles the old-time cobblestone road after the tops are removed from the plants. The bulbs generally grow partially on top of the surface, with roots extending downwardly into the ground. The tops of the plants extend upwardly and accordingly before the onions are topped, the bed or the row appears to be a tangled mess of green stalks. The stalks are relatively thick because the plants themselves are closely spaced.

In some areas, as indicated above, about a week prior to the harvesting of the onions, the onion tops are rolled in one direction. The rolling is accomplished by literally rolling over the tops of the plants just above the bulbs to knock down the tops. when the rolling of the tops has been accomplished, the bed appears to be a mass of green stalks generally aligned in a single direction. This rolling is part of the pre-harvest processing of the onion plants. The rolling prevents any new growth of the plant and helps dry out the neck of the onion prior to the harvesting. Thus, when the harvesting occurs, the onion has, as a result of rolling, ceased its growth and has started its drying out process which prevents bacteria from entering into the bulb itself.

Since the onion bulbs grow partially above the soil, any processing must be relatively gentle on the plants so as to prevent any damage, such as bruising or cutting, of the plants. Thus it is of substantial concern that the onion bulb not be harmed during the topping operation.

With the above description of the harvesting equipment comprising the prior art, and the brief outline of onion processing and harvesting, it is obvious that ordinary apparatus, such as used to remove the tops from sugar beets, carrots, and the like, would not be applicable to the removal of tops from onions. Accordingly, the apparatus of the present invention comprises apparatus which will mechanically remove the tops from plants, such as onions, without doing any harm to the bulb portion of the plant.

SUMMARY OF THE INVENTION

The invention described and claimed herein comprises a pair of frames, including a fixed frame secured to a prime mover, such as a tractor, and a floating frame secured to the fixed or main frame. The floating frams is adjustable in height with respect to the bed over which it is disposed. The floating frame includes fingers which raise the tops of plants and position the tops for cutting by a rotating cutter blade also secured to the floating frame.

Among the objects of the present invention are the following:

To provide new and useful apparatus for removing the tops from onions growing in onion beds;

To provide new and useful cutter apparatus movable over a bed of growing vegetables;

To provide new and useful cutter apparatus including a pair of frames secured together;

To provide new and useful apparatus for removing the tops from onions by lifting the tops and cutting the lifted tops;

To provide new and useful apparatus for removing the tops from onions at a predetermined height above the onion plants;

To provide a new and useful method for topping plants; and

To provide a new and useful method for removing the tops from onions.

BRIEF DESCRIPTION OF THE DRAWING

FIG. 2 is an exploded perspective view, partially cut away, of the onion topping apparatus of the present invention.

FIG. 5 is a perspective view of a portion of the apparatus of the present invention.

FIG. 6 is a view of a portion of the apparatus of FIG. 2 taken generally along line 6—6 thereof.

FIG. 9 is a vertical plan view of the apparatus of FIG. 7.

FIG. 10 is an enlarged side view of a portion of the apparatus of the present invention illustrating the operation of the rear wheels.

FIG. 11 is a side view of the apparatus of FIG. 10 showing sequentially the movement of the wheels.

FIG. 13 is a perspective view, somewhat enlarged, of a portion of the apparatus of the present invention.

FIG. 14 is a schematic view of a portion of the apparatus of the present invention illustrating the cooperation among the blades, the lifting fingers, and the cleaning knives of the alternate embodiment of the present invention.

FIG. 15 is a schematic rear view of a portion of the apparatus of FIGS. 7-14 illustratively showing the apparatus disposed over an onion bed.

DESCRIPTION OF THE PREFERRED EMBODIMENT

Figure 1A:
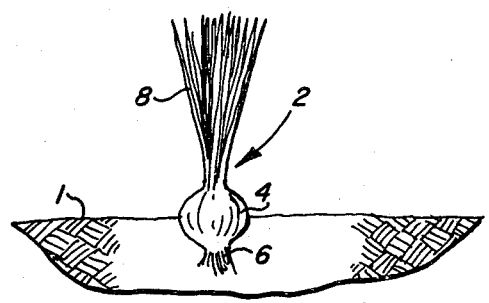
FIG. 1A is a representation of an onion growing in an onion bed.

FIG. 1A is a view illustrating a growing onion plant. An onion plant 2 is illustrated as growing in an onion bed or ground 1. The onion plant 2 includes a bulb 4 with roots extending downwardly from the bulb and tops 8 extending upwardly from the bulb. As shown in FIG. 1A, the bulb grows partially out of, or above, the surface of the ground or onion bed. The roots 6 comprise a multiplicity of stringy segments which extend downwardly into the soil of the onion bed to help anchor the onion plant.

The onion tops 8 comprise long tubulated leaves and a pithy stalk which extend upwardly from the bulb 4.

Figure 1B:
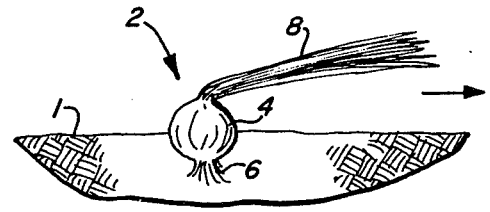
FIG. 1B shows the onion plant of FIG. 1A after the onion tops have been rolled.

FIG. 1B comprises a view of the onion plant 2 of FIG. 1A illustrating the rolling of the top or tops 8 prior to harvest. As previously indicated, the rolling of the onion tops may be a part of the pre-harvest processing of the onion plants. The rolling is accomplished in such a manner that the tops extend generally in the same direction with respect to the onion beds. The rolling occurs generally about a week prior to the harvesting of the onions. The arrow in FIG. 1B illustrates the direction of rolling of the onion tops.

While the rolling of the onion tops prevents new growth from occurring in the plant and helps dry out the neck of the onion, which is the portion of the onion at the juncture of the bulb and the tops, the rolling does not cause a separation or a breaking of the tops from the onion bulbs. Moreover, the rolling of the onion tops does not result in any harm to the bulb 4 or to the root structure 6 of onion plants. The bulb continues to maintain its same orientation with respect to the ground or to the onion bed. Essentially, the only change is with respect to the tops of each plant.

Since the onion plants may grow relatively dense in an onion bed, and since each onion plant includes a multiplicity of leaves extending outwardly from the juncture of the stalk or leaves and the bulb, the rolling of the onion tops results in a substantial mass of tops lying generally parallel to each other and overlying adjacent onion plants.

Figure 1C:
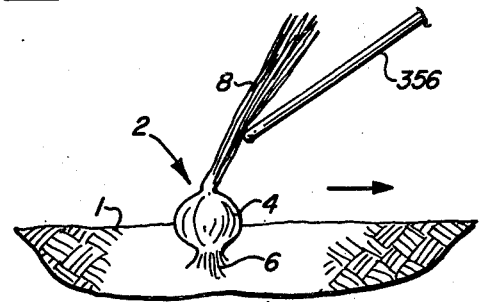
FIG. 1C shows the onion plant of FIG. 1B with apparatus of the present invention raising the bent or rolled onion tops.

Prior to the actual topping operation, or in conjunction with the actual topping operation, the tops of the onion plants are lifted in position for the cutting operation which severs the tops from the bulb and root. Sequentially, FIG. 1C illustrates the first step in the raising or lifting of the tops 8 of the onion plant 2. A rubber lifting finger 356 is shown lifting the top 8 of the onion plant 2 upwardly from its rolled position as shown in FIG. 1B. The lifting finger 356 rotates on an axis substantially parallel to the top of the onion bed and at an angle to, and not perpendicular or across the width of, the onion bed 1. That is, with the onion tops generally aligned along the length of the onion bed, the fingers rotate generally at an obtuse angle to the direction of the roll measured from the front center outwardly. This angular orientation is illustrated in detail below. The rotating fingers are disposed at an angle, not perpendicular, to the length and the width of the bed. With respect to each onion plant, the fingers are aligned such that they cause the tops to be raised, or lifted, as illustrated in FIG. 1C.

Figure 1D:
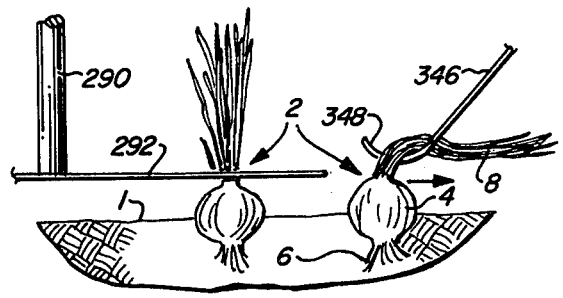
FIG. 1D is a sequential view of the onion plant of FIG. 1C illustrating the portion of the apparatus of the present invention positioning the onion top preparatory to its being cut.

FIG. 1D sequentially shows the next operation with respect to the topping of the onion plant 2 after the top 8 has been raised by a lifting finger. A curved positioning finger 346 rotates generally parallel to the lifting finger. The positioning finger includes a lower curved portion 348 which during the rotation process is inserted beneath the onion tops as initially lifted by the lifting fingers. The tops are positioned above the onion bed 1 and fed into a rotating blade 292 which severs the tops from the bulb at the juncture of the bulb and the top. This severing comprises the concluding step in the topping process. The blade 292 rotates generally parallel to the surface of the onion bed. Rotation is accomplished through a shaft 290 extending downwardly from the onion topping apparatus of the present invention. The blade 292 is secured to the lower end of the rotating shaft 290.

The direction of rolling of the tops of the onion plants is illustrated in FIG. 1B by an arrow. The onion topping apparatus moves along the onion beds in the same direction, as illustrated by similar horizontal arrows in FIGS.

1C and 1D. The direction of rotation of the lifting and positioning fingers is shown by the curved arrows adjacent the fingers.

FIG. 2 is an exploded perspective view, partially broken away, of the topping apparatus of the present invention. The apparatus includes a fixed frame 12 and a pair of floating frames 110 and 210 which are suspended within and secured to the fixed frame 12. The fixed frame is secured to a tractor which comprises not only the prime mover for pulling the apparatus, but also provides, from an appropriate power takeoff, the power used to move or rotate the lifting fingers, the positioning fingers, and the blades. The fixed frame is preferably secured to the tractor through a well-known 3 point suspension. The fixed frame is wide enough to accommodate a pair of floating frames, each of which is sufficiently wide to cover a single bed of onions. Accordingly, the apparatus tops two adjacent beds at the same time.

The fixed frame 12 comprises generally an outer frame to give it sufficient strength to support the pair of floating frames which are suspended within the fixed frame. The fixed frame includes a front top frame member 14 and a front lower frame member 16, which are parallel to each other and oriented transversely with respect to the longitudinal axis of the apparatus. The top and lower frame members 14 and 16 are connected together by a pair of parallel front right and left vertical frame members 18 and 20, respectively. The top frame member 14 is secured to the top of the vertical frame members. The lower frame member 16 is secured about centrally of the vertical frame members, such that the vertical frame members extend downwardly below the lower frame member 16. The lower frame member 16 is actually an intermediate cross or transverse frame member with respect to the entire fixed drame, but there is no other cross or transverse frame member below it, and accordingly it is referred to as "lower."

Three side frame members extend substantially parallel to each other, rearwardly from, and substantially perpeneicular to, the front vertical frame members. The three side frame members include a top right side frame member 24 which extends substantially perpendicular to both the front top member 14 and the front right vertical frame member 18, and is secured at the juncture of the two front frame members. It extends rearwardly a relatively short distance as compared to a middle right longitudinal side frame member 30. The longitudinal side frame members 28 and 30 are substantially parallel to each other and they extend generally perpendicular to the right front vertical frame member 18, to which they are secured. The side frame members 24, 28, and 30 are spaced apart from each other about equal distances, with the upper frame member 24 extending from the top of the vertical frame member 18, the lower side frame member 30 extending rearwardly from the lower end of the vertical frame member 18, and the middle frame member 28 extending rear-wardly from about the mid point of the right front vertical frame member 18.

The left side of the fixed frame 12 has three side frame members which correspond to members 24, 28, and 30. The left side frame members include a top left side frame member 26, secured to front left vertical frame member 20, and extending rearwardly therefrom, and substantially perpendicular thereto, from the juncture of the front vertical frame member 20 and the front top frame member 14. The top left side frame member 26 is substantially parallel to the top right side frame member 24. From about the center of the front left vertical frame member 20, a middle left longitudinal frame member 34 is secured and extends rearwardly, substantially parallel to the top left side frame member 26. From the lower portion of the left vertical frame member 20 there extends rearwardly a lower left longitudinal side frame member 36. The members 26, 34, and 36 are substantially parallel to each other, and also substantially parallel to their corresponding right side frame members 24, 28, and 30. The left longitudinal frame members 34 and 36 are of about equal length and are both substantially longer than the upper left frame member 26.

At the rear of the fixed frame 12 are a pair of rear vertical side frame members 32 and 38. The rear right vertical frame member 32 is secured to the ends of the right longitudinal side frame members 28 and 30, and the left rear vertical side frame member 38 is secured to the left longitudinal frame members 34 and 36 at their outer end. The rear vertical side frame members 32 and 38 are substantially parallel to each other and also substantially parallel to their corresponding front vertical side frame members 18 and 20, respectively. Since the front and rear vertical side members are substantially parallel to each other, and since the side longitudinal frame members are also substantially parallel to each other and are secured to the vertical frame members, and the vertical and side frame members are generally perpendicular to each other at their securement locations, it follows that the side frame members and vertical frame members form a rectangular side frame, with the vertical frame members extending upwardly from the rectangular frame and the upper side frame members extending substantially parallel to the longitudinal frame members of each rectangle.

To provide adequate and proper bracing for the upper side frame members 24 and 26 with respect to the front frame members and the side frame members, a pair of diagonal braces extend downwardly from the rear portion of the upper side braces 24 and 26. An upper front right diagonal side member 40 extends from the juncture of front right vertical side member 18 and the middle right longitudinal side frame member 28 upwardly and rearwardly to the top right side frame member 24. An upper right rear diagonal side frame member 44 extends downwardly and rearwardly from the juncture of upper or top right side frame member 24 and upper right front diagonal frame member 40 to the juncture of the rear right vertical side frame member 32 and the middle right longitudinal side frame member 28.

A pair of braces corresponding to members 40 and 44 are also found on the left side frame. An upper front left diagonal frame member 42 extends upwardly and rearwardly from the juncture of the left front vertical frame member 20 and the middle left longitudinal side frame member 34 to the rear end or portion of the top left side frame member 26. The members 40 and 42 are substantially parallel to each other.

An upper left rear diagonal frame side member 46 extends from the juncture of the side frame members 26 and 42 downwardly and rearwardly to the juncture of the left rear vertical frame member 38 and the middle left longitudinal side frame member 34. The members 44 and 46 are also substantially parallel to each other.

Another pair of diagonal frame members are also used to brace the side frames. A lower right diagonal frame member 50 extends upwardly and rearwardly from the juncture of the right vertical side frame member 18 and the lower right longitudinal side frame member 30 to about the mid point of the middle right longitudinal side frame member 28. Similarly, a lower left diagonal side frame member 52 extends upwardly and rearwardly from the juncture of the left vertical front frame member 20 to about the mid point of the middle left longitudinal side frame meber 34. All frame members are appropriately secured together, as by welding or the like.

Extending substantially parallel to the front top frame member 14 is a top middle frame member 22. The top middle frame member 22 is secured to the right side frame at the juncture of the top right side frame member 24 and the upper right diagonal braces or frame members 40 and 44. The frame member 22 is secured to the left side frame at the juncture of the top left side frame member 26 and the upper left diagonal braces 42 and 46. The brace 22 is substantially perpendicular to the braces 24 and 26 and substantially parallel to the front top frame member 14, and accordingly the members 14, 22, 24, and 26 form a rectangle. The frame members 14 and 22 extend transversely of the frame between the right and left side frames.

A rear frame member 48 extends generally parallel to the upper frame members 14 and 22, but in a different plane, but also substantially parallel to, and in the same horizontal plane as, the front lower frame member 16. The rear frame member 48 extends between the right and left frame members at the juncture of the vertical frame members 32 and 38 with their respective longitudinal and diagonal frame members 28 and 44, respectively, and 34 and 46, respectively. A large rectangular frame is formed by the front and rear frame members 16 and 48 and the longitudinal side frame members 28 and 34. As indicated previously, all of the members are secured together, preferably by welding.

Vertically oriented connector plates extend between the front top frame member 14 and the front lower frame member 16. The connector plates include a right connector plate 54, a pair of center connector plates 58 and 59, and a left connector plate 56. The right and left connector plates also provide connection for the floating frames, and will be discussed below. The three point suspension between the fixed frame and the tractor used to pull the apparatus connects to the right connector plate, the left connector plate, and the pair of center connector plates.

The center connector plates 58 and 59 are spaced apart slightly to allow for the insertion therebetween of a single connector arm from the tractor. The center connector plates 58 and 59 include a pair of aligned holes 94 or apertures at their upper portions through which is inserted a pin to connect the connector plates and the connector arm, with also a matching hole therein, to be secured together.

In addition to the parallel arm connections between the fixed frame 12 and the pair of floating frames 110 and 210, there is a spring suspension which extends vertically between the fixed frame and the floating frames. In the upper portion of FIG. 2, a pair of spring plates 60 and 62 are shown secured to the top middle frame member 22. A portion of a spring is shown secured to each of the plates. The springs are both tension springs, and accordingly the springs help to suspend, or transfer weight from, the floating frames with respect to the fixed frame. A tension spring 64 is shown secured to the spring plate 60. The upper portion of the spring 64 includes an upper threaded portion 65 which extends through an aperture in the plate 60. The spring is secured to the plate by a nut which is threadedly secured to the upper threaded portion. By varying the position of the nut with respect to the threaded portion 65, the tension on the spring 64 may be adjusted with respect to the plate 60 and to the fixed frame 12.

Another tension spring 66 is shown secured to the spring plate 62 by the engagement of upper threaded portion 67 through an aperture in the spring plate 62 and by the securing of the nut to the upper threaded portion 67. The springs 66 and 68 are substantially alike, and the means for adjusting them with respect to the floating frames are also substantially alike. If desired, a pair of springs may be secured to the fixed frame for each floating frame, rather than only a single spring for each floating frame, as shown in the upper portion of FIG. 2 secured to the plates 60 and 62 on the top middle frame member 22 of the fixed frame 12.

Beneath, and secured to, the rear frame member 48 is a gear box 70. The gear box is appropriately secured to the rear frame member and changes direction of input power to the gear box from an input or power takeoff shaft 72. The shaft 72 extends to the power takeoff unit at or on the tractor, and the rotary motion of the shaft 72 is in turn changed in direction within the gear box 70. A pair of shafts 74 and 84 extend out of the gear box 70 substantially perpendicular ro the shaft 72.

The shaft 74 comprises a right drive shaft which terminates away from the gear box 70 in a sprocket 78. Between the sprocket 78 and the gear box 70 is a bearing block 76 which provides support for the shaft 74. Another drive shaft, left drive shaft 74, extends outwardly from the gear box 70 and it terminates in a sprocket 88. The shaft 84 is also supported intermediate the gear box and the sprocket by a bearing block 86. The sprockets 78 and 88 are in turn used to change the direction of the rotary motion of output shafts 74 and 84 for supplying power to the floating frames. A roller chain 80 is illustrated as extending around the sprocket 78, and a roller chain 90 is shown extending about the sprocket 88.

In the lower portion of FIG. 2 is a pair of floating frames 110 and 210 which fit in, or nest within, the fixed frame 12. The floating frames are substantially identical and each is designed to cover a single onion bed during the topping process.

Right floating frame 110 includes a front frame member 114 and a pair of side frame members 116 and 118 secured to the ends of the front frame member and extending rearwardly substantially perpendicular to the front frame member. Frame member 116 extends rearwardly on the right side of the frame, and side frame member 118 extends rearwardly from the left side of the front frame member. The right and left side frame members 116 and 118 are secured together by a rear frame member 120, which is substantially parallel to the front frame member 114. The frame members 114, 116, 118, and 120 define and comprise a rectangular frame. A pair of vertical frame members, right vertical frame member 130 and left vertical frame member 132, extend upwardly from about the mid point, and substantially perpendicular to, the right side frame member 116 and left side frame member 118, respectively. A top frame member 136 extends between the vertical frame members 130 and 132.

A pair of upper diagonal frame members, including right front diagonal frame member 138 and left front diagonal frame member 140 extend forwardly and downwardly from the juncture of the top frame member 136 and the vertical frame members 130 and 132, respectively. The diagonal frame members are secured to the front frame member 114 at the juncture of its respective side frame members 116 and 118.

Another pair of diagonal frame members, including right rear diagonal frame member 142 and left rear diagonal frame member 144 extend downwardly and rearwardly from the top frame member 136 to the rear frame member 120, where they are respectively secured at the juncture of the rear frame member 120 and the side frame members 116 and 118, respectively.

A pair of vertical frame members, including right rear vertical frame member 146 and left rear vertical frame member 148, extend downwardly from the rear frame member 120 from the junctures of the rear frame member 120 and the right side frame member 116 and rear diagonal frame members 142 and with the left side frame member 118 and rear diagonal frame member 144, respectively. The rear vertical frame members 146 and 148 are substantially perpendicular to the rear frame members 120 and to the side frame members 116 and 118.

The rear vertical frame members support an axle 150 which extends between, and is secured to, the vertical frame members. In turn, the axle 150 provides support for a roller 152 which is journaled for rotation on the axle 150. The axle 150 is secured in a pair of slots 147 and 149 in the vertical frame members 146 and 148, respectively. By adjusting the axle vertically in the slots, the height of a cutter blade 192 above the onion bed may be varied. In this manner, the roller 152 acts as a height gauge for the cutter blade to gauge the height above the onion bed that the blade rotates.

The roller 152 rolls over the bed of onions and, in addition to the function discussed in the preceding paragraph, provides support for the floating frame at the rear thereof. The roller 152 is substantially the width of an onion bed, as illustrated below in FIG. 5.

Between the front frame member 114 and the rear frame member 120, and substantially parallel thereto, is a pair of intermediate transverse frame members, including forward transverse frame member 160 and center transverse frame member 162. The transverse frame members extend between the side frame members, and are accordingly and appropriately secured thereto. The forward transverse frame member provides a lower suspension point on the floating frame for the spring, or springs, such as spring 64 shown secured to the fixed frame. With respect to the fixed frame 12 illustrated in FIG. 2, only a single spring, spring 64, is shown secured to the right side of the fixed frame to be secured to floating frame 110. If desired, and preferably, a pair of springs should be secured between the fixed frame and each floating frame. For purposes of clarity, only a single spring 64 is shown secured to the right portion of the fixed frame 12. However, in the lower portion of FIG. 2, and illustrated with respect to both the right floating frame 110 and left floating frame 210, is a pair of lower threaded portions of tension springs, such as lower threaded portions 164 and 166, shown secured to the forward transverse frame member 160. While only one spring is shown secured to the fixed frame for each floating frame in the upper portion of FIG. 1, the lower portions of two springs is shown secured to each floating frame. One or two springs may be used, as desired. The use of a pair of springs extending between each floating frame and the fixed frame provides for more stability of the floating frame. One or two springs may be used, as desired. The use of a pair of springs extending between each floating frame and the fixed frame provides for more stability of the floating frames during the topping process. The lower threaded portions of the tension springs extend appropriately through apertures in the transverse frame members and are appropriately secured therein, preferably by nuts.

Each floating frame includes two pairs of parallel arms which, with the spring(s) comprise the means for attaching or securing the floating frames to the fixed frames. Right floating frame 110 includes a pair of right parallel arms 170 and 171 and a pair of left parallel arms 172 and 173. Parallel arms 170 and 172 are upper parallel arms, and arms 171 and 173 are lower parallel arms. Upper arm 170 is pivotally secured to the upper portion of right vertical frame member 130 of floating frame 110 at one of its ends, and is pivotally secured at its opposite end to the upper portion of front right vertical frame member 18. The lower arm 171 is pivotally secured also to both the right vertical frame member 130 of the floating frame 110, and also to the right front vertical frame member 18 of the fixed frame 12. The two arms 170 and 171 are parallel to each other and are accordingly secured at their respective opposite ends an equal distance apart from each other. Similarly, the left parallel arms 172 and 173 are secured an equal distance apart at their respective ends to the left vertical frame member 132 of the floating frame and to the right connector plate 54 of the fixed frame 12.

The parallel relationship between the arms with respect to both the floating frame and the fixed frame provides for the same relative orientation between the fixed frame and the floating frame as the specific height adjustment is made between the floating frame and the fixed frame by the adjustment of the roller at the rear end of the floating forms. The pivotal connection between the parallel arms and respective frames is accomplished by an appropriate, well-known means.

In the upper portion of FIG. 2, the power takeoff shaft 72 is illustrated as extending to a gear box 70, from which a pair of shafts 74 and 84 extend outwardly and ultimately terminate in a pair of sprockets, such as sprockets 78 and 88, respectively. A roller chain 80 is shown extending to a portion of a floating frame. The chain 80 extends to, and is disposed about, a sprocket 182 which is secured to a shaft extending outwardly from within a transmission housing 180. The transmission within the housing 180 provides for the appropriate gear ratios for operating the various rotating components, including the lifting fingers, the positioning fingers, the rotating blades, and also high speed cleaning knives, or blades, all of which will be illustrated and discussed in detail below.

For illustrative purposes, certain speeds in terms of rpm, gear ratios, and pulley sizes will be described. Such speeds will be clearly understood as being illustrative only, and, in practice, may and will vary according to the speed of the tractor pulling the apparatus, and other factors, such as actual gear ratios and pulley sizes.

There is a 1 to 1 speed ratio through all of the shafts down to and including the input shaft to the transmission within the transmission housing 180. For example, the power takeoff shaft 72 operates at about 525 rpm, and the shafts 74 and 84, extending outwardly from the gear box 70, also rotate at a speed of about 525 rpm. The sprockets 78 and 182 are of the same size, and accordingly the power input shaft from the sprocket 182 to the transmission within the transmission housing 180 also rotates at about 525 rpm. However, there is preferably a reduction ratio of about 2.1 to 1 with respect to the output shaft from the transmission housing 180. Accordingly, rotation of output shaft 184 is about 260 rpm. A sprocket 186 is secured to the shaft 184 and accordingly rotates with the shaft at about 260 rpm. A roller chain 188 is shown extending about the pulley 186. The chain in turn drives a sprocket on a shaft, the rotation of which shaft is in turn imparted to the lifting fingers, the positioning fingers, and the high speed cleaning knives. This will be discussed and illustrated below in connection with FIG. 3.

Extending downwardly from the transmission housing 180 is a shaft 190. There is preferably about a 2 to 1 increase in the speed of the shaft 190 over the speed of the input shaft to the transmission housing 180. Accordingly, the output shaft 190 rotates at about 1050 rpm. A cutter blade 192 is secured to the lower end of the shaft 190. The rotating cutter blade 192 is preferably a blade with two arms, extending oppositely with respect to each other from the shaft 190. The rotation of the cutter blade imparted by the shaft 190 cuts the tops off the onions as the apparatus moves over an onion bed.

The left floating frame 210 is substantially identical to the right floating frame 110. The corresponding frame members and other elements which comprise the floating frame 210 have been given reference numerals which correspond to the reference numerals assigned to the various frame elements, except that the prefix number for the left floating frame 210 is "2" rather than the prefix "1" given to the elements of the right floating frame 110. As with the other frame members or elements illustrated in conjunction with the fixed frame 12 and the right floating frame 110, various elements or members have been broken away or have been omitted from the left floating frame 210 in FIG. 2 for purposes of clarity. Since the right floating frame 110 has been described in substantial detail, the left floating frame will be described only briefly.

The left floating frame includes a right side frame member 216 and a left side frame member 218, with a rear frame member 220 extending therebetween and secured to both the side frame members. The side frame members 216 and 220 are substantially parallel to each other. Extending upwardly from the juncture of the right side frame member 216 and the rear frame member 220 is a right rear diagonal frame member 242. The opposite side of the frame also includes a diagonal frame member, left rear diagonal frame member 244, which is secured to the juncture of the left side frame member 218 and the rear frame member 220, and extends forwardly and upwardly therefrom. The rear diagonal frame members 242 and 244 are substantially parallel to each other. They extend upwardly to a top frame member 236, at opposite ends of which they are respectively secured. The top frame member 236 extends between a pair of vertical frame members, comprising right vertical frame member 30 and left vertical frame member 32, which extend upwardly substantially parallel to each other and substantially perpendicular to the right and left side frame members 218 and 220, respectively. A transverse frame member 262 extends between the right and left frame members 216 and 218 at the juncture respectively of the vertical frame members 230 and 232.

Transmission housing 280 is secured to the transverse frame member 262. Forward of the transverse frame member 262 is another transverse frame member, identified as transverse frame member 260, which is also respectively secured to the side frame members 216 and 218. The transverse frame member 260 provides the securement point for the tension springs which extend between the floating frame and the fixed frame. As illustrated in FIG. 2, lower threaded portions 264 and 266 of appropriate tension springs extend through apertures in the frame member 260 and are secured to the frame member by appropriate bolts. As previously indicated, only a single spring, such as shown secured to fixed frame 12, may be used with each floating frame.

Parallel arms extend from the vertical frame members 230 and 232 to the floating frame. In FIG. 2, lower right parallel arm 271 is shown pivotally secured to the right vertical frame member 230, while both left parallel arms, upper parallel arm 272 and lower parallel arm 273, are shown respectively secured to the fixed frame. Parallel arms 270 and 271 are shown pivotally secured to left connector plate 56, and the parallel arms 272 and 273 are shown pivotally secured to left front vertical frame member 20. From the juncture of the side frame members and the rear frame member and the rear diagonal frame members, a pair of vertical frame members 246 and 248 extend downwardly. An axle 250 extends between the downwardly depending vertical frame members in a pair of slots 247 and 249 in the vertical frame members 246 and 248, respectively, and a roller 252 is journaled for rotation thereon.

The chain 90 is shown extending about a sprocket 282 which is secured to input shaft 283 of the transmission housing 280. An output chain 288 is shown extending about output sprocket 286. As illustrated in FIG. 2, the input power chain 90 is shown extending rearwardly from the sprocket 282 and the transmission housing 280, and the output power chain 288 is shown extending forwardly from the transmission housing about its sprocket 286.

In the above description of the fixed frame and the floating frame, reference has been made to the various elements of the frames being secured to each other and extending between one member and another member. It is understood that the frame members are appropriately secured together, such as by welding, preferably. However, obviously any well known fastening means, such as bolts or rivets, may also be used to secure the various frame members or elements together. Similarly, the pivotal securement of the parallel arms may be by any appropriate means. Illustrated in FIG. 2 are the various frame members preferably made of angle iron or square tubular steel. However, any appropriate structural material may be used, such as channel iron, or the like.

Figure 3:
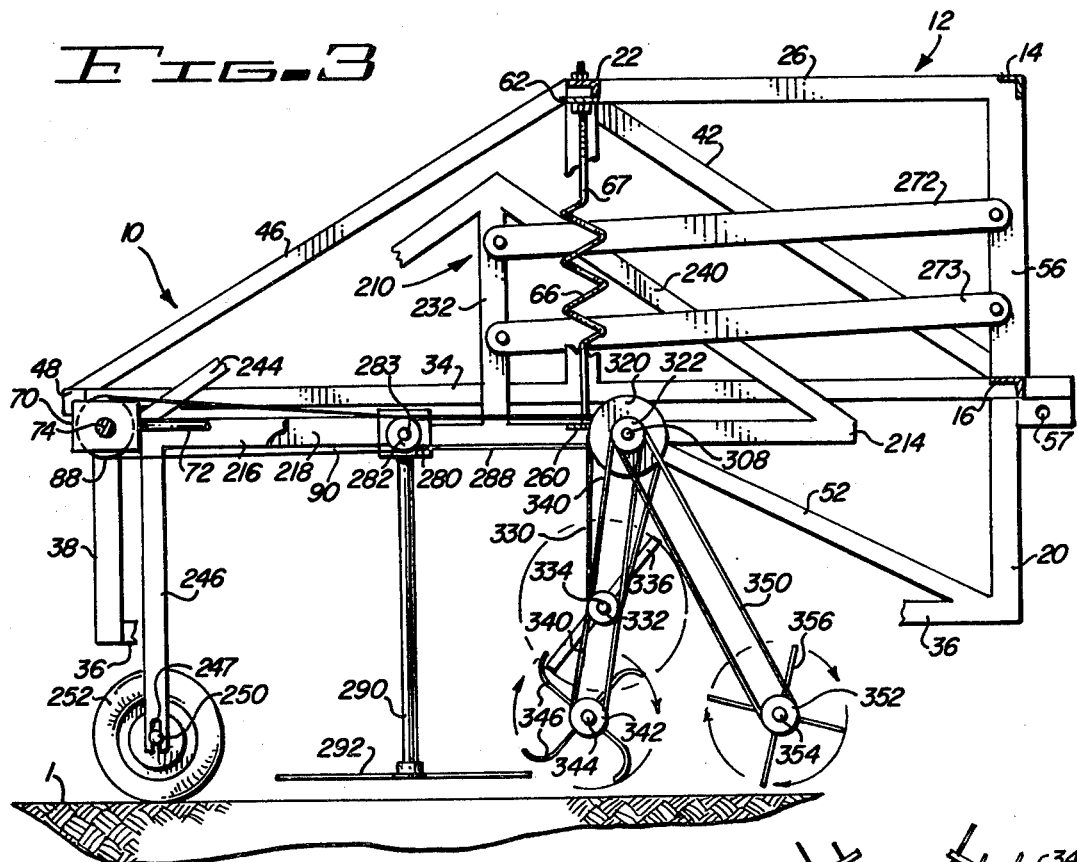
FIG. 3 is a side view of the onion topping apparatus of the present invention, taken generally along line 3—3 of FIG. 2.

FIG. 3 is a side view, in partial section, of the fixed frame and a floating frame, and also illustrating the relative positioning of the cutter blade, the lifting fingers, the positioning fingers, and high speed cleaning blades or knives.

Various elements of the fixed frame are shown in relation to the floating frame, which, in FIG. 3, is the left floating frame of FIG. 2. The onion topping apparatus 10 in FIG. 3 includes both the fixed frame 12 and the left floating frame 210. Of the fixed frame 12, the front top and lower frame members 14 and 16 are shown in section, and they are joined respectively to top left side frame 26 and middle left longitudinal side frame member 24. The upper or top side frame member 26 is also shown secured to top middle frame member 22, which is substantially parallel to the front top member 14. The middle left longitudinal side frame member 34 is also shown secured to the rear frame member 48, which is substantially parallel to the front lower frame member 16. Extending downwardly from the juncture of the middle left longitudinal side frame member 34 and the rear frame member 48 is the downwardly depending rear left vertical side frame member 38. Extending forwardly from the frame member 38, and substantially parallel to the middle left longitudinal side frame member 34, is the lower left longitudinal side frame member 36. The upper left front and rear diagonal side frame members 42 and 46, respectively, are shown extending forwardly and rearwardly, respectively, and downwardly, from the juncture of the top middle frame member 22 and the top left side frame member 26 to, respectively, the juncture of the front lower frame member 16 and the rear frame member 48 with the middle left longitudinal side frame member 34. What has been described thus far with respect to the fixed frame 12, is primarily the left side of the fixed frame, plus the transverse frame members, shown in section, and comprising the members or elements 14, 16, 22, and 48. Each of the members or elements is shown in greater detail in FIG. 2.

The front left vertical frame member 20 is shown extending downwardly below the middle left longitudinal side frame member 34, and lower left diagonal side frame member 32 is shown extending downwardly and forwardly from the frame member 34 to the juncture of the vertical frame member 40 and the lower longitudinal side frame member 36.

The left connector plate 56 is shown extending between the front frame members 14 and 16, and extending slightly below and in front of the frame member 16. An aperture 57, which receives a bolt or a pin, or the like, is shown extending through the lower portion of the left connector plate 56. The bolt or pin received by the aperture 57 is used in connection with the securing of the fixed frame to a tractor. Accordingly, the aperture 57, with a bolt or pin therethrough, is one of the three suspension points for connecting the apparatus 10 to a tractor or other pulling or hauling vehicle in a well known manner.

At the rear of the fixed frame is the gear box 70, secured to, and disposed below the rear frame member 48. The power takeoff shaft 72, which extends from and is connected to the power takeoff connection of the pulling vehicle, is connected with gearing apparatus within the gear box 70. Right drive shaft 74 is shown in section extending from the gear box 70. Above and beneath the gear box 70 is shown a portion of sprocket 88, about which is disposed chain 90. The chain 90 extends to sprocket 282 which is secured to shaft 283 extending outwardly from transmission housing 280. The chain 288 is the driving chain which extends forwardly from a sprocket also secured on a shaft extending from the transmission 280. The chain 288 extends forwardly to a sprocket secured to another shaft, shaft 300, which in turn is secured to the floating frame 210.

To illustrate the inner relationship between the fixed frame 12 and the floating frame 210, portions of structural members of both frames have been broken away. For example, right side frame member 216 of the left floating frame 210 is shown broken away just forwardly of its intersection with the downwardly depending right rear vertical frame member 246 and the left rear diagonal frame member 244, which is also shown partially broken away. Substantially parallel to the member 216 is the left side frame member 218, which is shown extending forwardly to the front frame member 214 where it is secured to the front frame member and also to a diagonal frame member, left front diagonal frame member 240. The diagonal frame members 240 and 244 are secured together at the upper portion of the left vertical frame member 232, which is secured at its lower end to the left side frame member 218.

The parallel arms 272 and 273 are shown extending between the vertical frame member 232 and the connecting plate 56. As indicated above, the parallel arms are pivotally connected to both the fixed frame and the floating frame.

A single tension spring, tension spring 66, is shown secured at its upper threaded portion 67 to the plate 62 at the top middle frame member 22 of the fixed frame 12, and at its lower threaded portion, to transverse frame member 260 of the floating frame between the suspension points at which the parallel arms are secured to the floating frame and the fixed frame. The spring, plus another tension spring, if desired, as illustrated in the lower portion of FIG. 2, is accordingly used to be the primary support for the weight of the floating frame, while the parallel arms, as discussed above, are used to maintain the orientation or relative positions between the floating frame and the fixed frame. The use of the threaded portions of the spring, particularly the upper threaded portion 67, may be adjusted as desired to transfer or vary the weight of the floating frame with respect to the fixed frame. The use of the parallel arms maintains the horizontal alignment between the two frames and prevents the misalignment of the floating frame with respect to the fixed frame, which in turn results in the proper and appropriate positioning of the cutter blade 292 and of the respective fingers with respect to the onion bed over which the apparatus moves.

The roller 252 is shown disposed on axle 250 which extends through, and is appropriately secured to, the downwardly depending right rear vertical frame member 246.

Extending downwardly from the transmission 280 is the shaft 290. At the lower end of the shaft 290 is secured the rotating cutter blade 292. The rotating cutter blade is disposed substantially parallel to the ground 1, comprising the onion bed, over which the apparatus is disposed. The roller 252 is also disposed on the ground 1, and rolls over the onion bed to provide a gauge for the cutter 292. The roller is vertically adjustable in slot 247.

From the transmission 280, a chain 288 extends forwardly to a sprocket secured to a shaft and journaled for rotation in the center portion of the floating frame 210. The shaft to which the sprocket is secured is in turn connected to a shaft 308 which has secured thereto pulleys from which belts extend to the shafts which carry the lifting fingers, the positioning fingers, and high speed cleaning knives. In FIG. 3, a pulley 320 is shown secured to the shaft 308 and a pair of pulleys 322 are also shown secured to the shaft 308. A belt 330 extends around the pulley 320 downwardly to a relatively smaller pulley 332 which is in turn secured to a shaft 334. A plurality of high speed cleaning knives are secured to the shaft 334. The use of the pulley 320 on shaft 308 and the pulley 332 on the shaft 334 provides an appropriate increase in the rotational speed of the shaft 334 over that of shaft 308.

The pair of pulleys 322 are of a lesser diameter than the pulley 320. Belt 340, which extends over one of the pulleys 322, extends also around a pulley 342 secured to shaft 344. The pulley 342 is larger than the pulley 322, which results in a speed reduction between the two shafts. The shaft 344, with a plurality of lifting fingers 346 secured thereto, accordingly rotates at an appropriately lower speed.

As illustrated in FIG. 3, and as shown in more detail in FIG. 5, the lifting fingers 346 are curved at their outer ends. The curvature is also illustrated above in FIG. 1D.

The other pulley 322 provides the power for rotating shaft 354, to which is secured a pulley 352. A belt 350 extends between the two pulleys. A plurality of lifting fingers 356 are secured to the shaft 354. The size of pulleys 322 and 352 are illustrated as being the same, and accordingly the lifting fingers 356 on the shaft 354 rotate at about the same speed.

The various shafts, such as shafts 308, 334, 344, and 352, are appropriately secured to, and journaled for rotation on, frame members of the floating frames. The specific frame members have been omitted for clarity, but are well known and understood in the art. Moreover, each of the shafts includes a plurality of hubs to which the various fingers and blades are secured in a well known manner.

Figure 4:
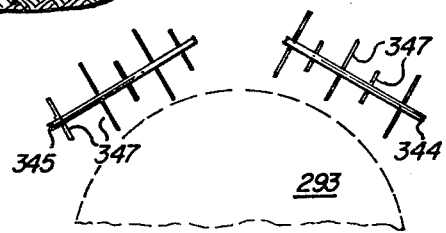
FIG. 4 is a schematic representation of the arc of the cutter blade and of the orientation of the positioning fingers in the present invention.

FIG. 4 is a schematic view illustrating the orientation of the shafts of the positioning fingers with respect to the arc or circle of travel of the cutter blade. The outer tips of the cutter blade describe an arc 293. The positioning fingers are secured to hubs on shafts 344 and 345 disposed in front of the arc or circle described by the cutter blade. Shafts 344 and 345 are disposed at an obtuse angle with respect to each other measured counterclockwise from shaft 344 to shaft 345. The blade 292 (see FIG. 3) has two sets of lifting fingers, positioning fingers, and cleaning blades associated with it. The two sets are represented in FIG. 4 by the two shafts 344 and 345. Each set of shafts of the lifting fingers, positioning fingers, and cleaning knives or blades are parallel to each other, with the sets at an obtuse angle to each other, as shown in FIG. 5.

FIG. 5 is a perspective view of a portion of the apparatus of the present invention, comprising a more detailed illustration of the various shafts, fingers, and blades. The large arrow at the upper portion of the figure indicates the direction of travel of the onion topping apparatus. For purposes of clarity, various components are broken away, thus leaving only fragmentary portions of the apparatus to better and more clearly illustrate the relative location of the various components and their cooperation and function.

Chain 288 is shown extending around sprocket 300, which is in turn secured to shaft 302. By reference to FIGS. 2 and 3, it will be realized that chain 288 is aligned substantially longitudinally of the apparatus. Accordingly, shaft 302, secured to the sprocket 300, is substantially transverse or perpendicular to the longitudinal axis of the apparatus. However, the four primary shafts including power supply or driving shafts 308 and 310 and the three shafts for the lifting and positioning fingers and cleaning knives of each of the two sets on either side of shaft 302 and sprocket 300, are oriented at an angular orientation other than perpendicular with respect to both the longitudinal axis of the apparatus and to the transverse axis of the apparatus, and generally at an obtuse angle with respect to each other measured counterclockwise from the right hand set (shafts 308, 334, 344, and 354) to the left hand set (shafts 310, 335, etc.). This has been discussed above, and and is shown clearly in FIGS. 4 and 5. The outer ends of the shafts carrying the fingers and blades are swept back, from front to back, for increased cooperation among the blades and fingers with respect to the cutter blade 292, secured to the lower end of shaft 290.

Since the power supply or driving shafts are not axially aligned, a pair of universal joints 304 and 306 are secured to the shaft 302, one at each end of the shaft. Universal joint 304 couples shaft 308 to shaft 302, and universal joint 306 couples shaft 302 to another shaft 310. The shafts 308 and 310 are accordingly extensions of driving shaft 302 and are themselves the driving shafts for the lifting fingers, the positioning fingers, and the cleaning blades. At the outer end of shaft 308, remote from shaft 302, is a relatively large pulley 320. The pulley 320 is coupled to a pulley 332, disposed beneath the pulley 320. The pulley 332 is of substantially less diameter than the pulley 320. Shaft 334 is secured to the pulley 332. The ratio between the size of the pulleys 320 and 332 provides an increase in the speed of rotation of shaft 334, as noted above.

A pair of outer pulleys 322 are also secured to the shaft 308. One of the pulleys 322 is coupled to a pulley 342, which is disposed beneath and slightly to the rear of the pulley 332. Accordingly, shaft 344, secured to the pulley 342, is also disposed beneath and slightly to the rear of shaft 334. The ratio of the diameters of the pulleys 322 and 342 results in a decrease in the rpm of pulley 342 and its shaft 344, from that of shaft 308 and the pulleys 322, and the positioning fingers 346 on shaft 344 accordingly rotate slower than the cleaning blades 336 on shaft 334.

The other outer pulley 322 is coupled to a pulley 352, disposed below and forward of the pulley 322 and its shaft 308, by a belt 350. The pulleys 322 and 352 are substantially the same size, and accordingly the pulley 352 and its shaft 354 rotate at about the same rpm as the pulley 322 and its shaft 308. The shaft 354 includes a plurality of lifting fingers 356 secured thereto.

Shaft 310 is substantially identical to shaft 308, and it comprises the driving shaft for the high speed cleaning knives, or blades, rotating on their shaft, the positioning fingers rotating on their shaft beneath and slightly rearwardly of the cleaning knives, and the lifting fingers disposed forwardly of the cleaning knives and positioning fingers. The lifting fingers and their shaft driven from shaft 310 are not shown in FIG. 4.

Secured to the shaft 310 is a larger pulley 321 and a pair of smaller pulleys 323. The pulley 321 is coupled to a pulley 333 by a belt 331. Shaft 335 is secured to the pulley 333 and rotates therewith, resulting in the rotation of a plurality of high speed cleaning knives or blades 337 secured thereto. Since the diameter of pulley 335 is less than the diameter of pulley 321, the rpm of shaft 335 will be greater than the rpm of shaft 310. The relative speeds of the various shafts and fingers on blades secured thereto have been discussed above.

One of the pulleys 323 is coupled to a pulley 343 by a belt 341. A shaft 345 is in turn secured to the pulley 343 and a plurality of positioning fingers 347 are secured to the shaft 345, and accordingly rotate therewith.

The lifting fingers 356 are preferably straight and extend outwardly from the shaft 354, with a plurality of fingers disposed on the same hub on the shaft. In FIG. 4, five sets or pairs of fingers are illustrated as secured to the shaft 354. The lifting fingers are preferably of a flexible material, such as hard rubber, as opposed to a rigid material, such as steel. The purpose of the lifting fingers, discussed above in conjunction with FIG 1C, is to lift and fluff the tops of the onion plants. Accordingly, as the onion topping apparatus rolls over an onion bed, the tops, which may be rolled down and pointing in the direction of travel of the topping apparatus, are lifted and fluffed by the lifting fingers and are then hooked and positioned by the curved positioning fingers 346. The positioning fingers 346 are disposed adjacent but slightly to the rear, with respect to the line or direction of travel of the apparatus, of the lifting fingers 356.

The positioning fingers 346 comprise a pair of fingers opposite each other, with adjacent pairs illustrated as disposed ninety degrees from each other. The outer or distal ends of each of the positioning fingers 346 is curved in order to properly hook the tops and position the tops preparatory to the cutting of the tops by the rotating cutting blade 392.

The cutter blade 292 rotates on shaft 290, and the outer ends or edges of the cutter blade describe a circle. With the shafts of the fingers disposed at an obtuse angle with respect to the longitudinal axis of the apparatus from the front, maximum efficiency of the cutter blade and of the positioning fingers is obtained since the shafts of both sets of positioning fingers have maximum exposure with respect to the circle, or part of a circle or arc, described by the rotating cutter blade. That is, the shafts 344 and 345 are positioned with respect to each other and to the rotating cutter blade so that the shafts are forward of the arc described by the rotating cutter blade, but the arc of travel of the moving or rotating positioning fingers overlaps a portion of the arc or circle of the rotating cutter blade. However, the radial length of the positioning fingers and accordingly the fingers and the blade do not interfere with each other.

The curved positioning fingers are relatively rigid. With the rotational axes of the shafts carrying the positioning fingers set at an angle to the direction in which the onion tops are disposed after being rolled, the lifting fingers contact the onion tops at an angle and fluff the tops preparatory to contact between the positioning fingers and the tops. The positioning fingers in turn pick up or hook the tops and position the tops and feed them into the rotating cutter blade.

Disposed above the positioning fingers, and slightly forward of them, are the high speed cleaning knives or blades. The blades, illustrated in FIG. 5, at 336 and 337, are secured respectively to shafts 334 and 335. The orientation of the knife blades 336 and 337 with respect to the positioning fingers 346 and 347 is important in the cleaning process accomplished by the knives. A description of the onion tops is included above. The tops, comprising the pithy stalk and tubulated leaves, are relatively thick and in order for the topping apparatus to function properly, the severed tops must be removed from the positioning fingers. The positioning fingers must rotate relatively slowly in order to appropriately hold, position, and feed the tops into the rotating cutter blade. The motion of the positioning fingers is rotary motion and is continuous. Accordingly, as the tops are severed by the cutting blade, the severed tops move upwardly with the positioning fingers. Disposed above and adjacent each finger are the high speed cleaning knives. The cleaning knives are relatively rigid and they each include a blade portion which severs and cuts the tops away from the positioning fingers. Since the cleaning knives rotate faster than the positioning fingers, the cleaning knives effectively sever the onion tops and accordingly clean the fingers before the downward movement of fingers to pick up, lift, and position adjacent tops preparatory to the cutting action by the horizontally rotating cutter blade. Accordingly, the purpose of the high speed cleaning knives is to clean the positioning fingers by severing and removing the onions tops lifted by the positioning fingers after the cutting or topping of the onion tops from the bulbs by the rotating cutter blade.

FIG. 6 is a view of a portion of the apparatus of FIG. 2, taken generally along line 66 of FIG. 2, and comprising a rear view, in partial section, of a portion of the onion topping apparatus of the present invention disposed on a pair of adjacent onion beds. A portion of the fixed frame 12 is shown with its pair of floating frames 110 and 210 disposed therein. Of the fixed frame, there is shown the rear frame member 48, with its pair of downwardly depending right and left vertical side frame members 32 and 38 secured thereto. Extending upwardly from the juncture of the rear frame member 48 and the downwardly depending rear side frame members 32 and 38 are the right and left rear diagonal side frame members 44 and 46, respectively. Gear box 70 is shown disposed beneath the rear frame member 48. A pair of shafts 74 and 84 extend to the right and to the left, respectively, from the gear box 70. The shaft 74 extends through, and is supported and journaled in, a bearing block 76, while the shaft 84 extends through, and is journaled for rotation in, a bearing block 86. The shaft 74 extends to a sprocket 78 which is secured to its outer end, while the shaft 84 extends to and is secured to a sprocket 88 at its outer end. Appropriate chain drives extend respectively from the sprockets 78 and 88 to sprockets and shafts coupled through the transmission housings 180 and 280 of the floating frames 110 and 210, respectively.

With the direction of movement of the onion topping apparatus shown in FIG. 6 as moving into the paper, the portion of floating frame 210 illustrated in FIG. 5 is forward of, or in front of, the portion of the floating frame 110 also shown in FIG. 6. Both floating frames are shown disposed over a pair of onion beds 1, with a furrow 9 between the onion beds and other furrows 9 shown outwardly of the two onion beds.

With respect to floating frame 210, there is shown a transverse frame member 262, to which is secured the transmission housing 280. The side frame members 216 and 218 are shown in section. Extending vertically downwardly from the transmission housing 280 is the shaft 290, at the lower end of which is the horizontally rotating cutter blade 292. Above the cutter blade 292, and horizontally disposed, are the shafts 344 and 345 to which are secured for rotation in the vertical plane the positioning fingers 346 and 347, respectively. The rotating shafts for the lifting fingers, positioning fingers, and cleaning knives are appropriately secured to, and journalled for rotation on, a plurality of vertically extending frame members, such as frame members 224. Disposed above, and parallel to the shafts 344 and 345, are the shafts 334 and 335, with their cleaning knives 336 and 337, respectively, and also rotating in the vertical plane, secured thereto.

Portions of the right floating frame 110 are shown from the rear in FIG. 6. The rear frame member 120 is shown with its downwardly depending vertical frame members 146 and 148 secured to the right and left portions of the rear frame member, respectively. The shaft or axle 150 is shown extending between the vertical frame members 146 and 148, and the roller 152 is shown on the shaft or axle 150. The roller 152 is shown disposed on the top of an onion bed 1.

Extending downwardly from the transmission 180 is the shaft 190, which carries a rotating cutter blade at its lower end.

The gear box 180 is shown with a sprocket 186 secured thereto, and the transmission housing 280 is shown with a sprocket 286 secured thereto. The sprockets 186 and 286 in turn are connected to appropriate shafts which drive the lifting fingers, the positioning fingers, and the rotating knives, illustrated in the other figures. For purposes of clarity, the mechanical drive connections between the sprocket 286 and the shafts 334, 335, and 344, 345, are omitted from FIG. 6.

In the figures in the drawing herein, arrows showing the direction of rotation of the various shafts are shown, and there are also shown arrows indicating the direction of travel of the apparatus. The mechanical linkage between the various rotating portions of the apparatus is illustrated and described as either through shafts and universal joints, or chains and sprockets or belts and pulleys. Obviously, any appropriate type arrangement may be used, and such are well known in the art.

A single fixed frame is illustrated as having a pair of floating frames disposed within and secured to it. Each floating frame is independently movable and adjustable relative to the fixed frame.

Each floating frame includes two sets each of lifting fingers, positioning fingers, and cleaning knives, both sets of which rotate generally in the vertical plane. In each set, the shafts are generally parallel to each other and spaced apart and accordingly the fingers and blades rotate generally parallel to and adjacent each other, with the cleaning blades rotating in relatively close proximity to the positioning fingers. However, the sets are disposed at an angle to each other.

The onion topping apparatus described herein effectively and efficiently removes the tops from onion plants growing in onions beds preparatory to the harvesting of the onions. A single fixed frame is illustrated as being connected to a tractor and including within the fixed frame a pair of floating frames, each of which severs the tops of onions in a single bed, accordingly allowing two beds of onions to be topped at the same time. If desired, of course, only one floating frame could be disposed within a single fixed frame. Moreover, a single set of fingers and cleaning blades could be used with each floating frame instead of the two sets as shown and described.

Figure 7:
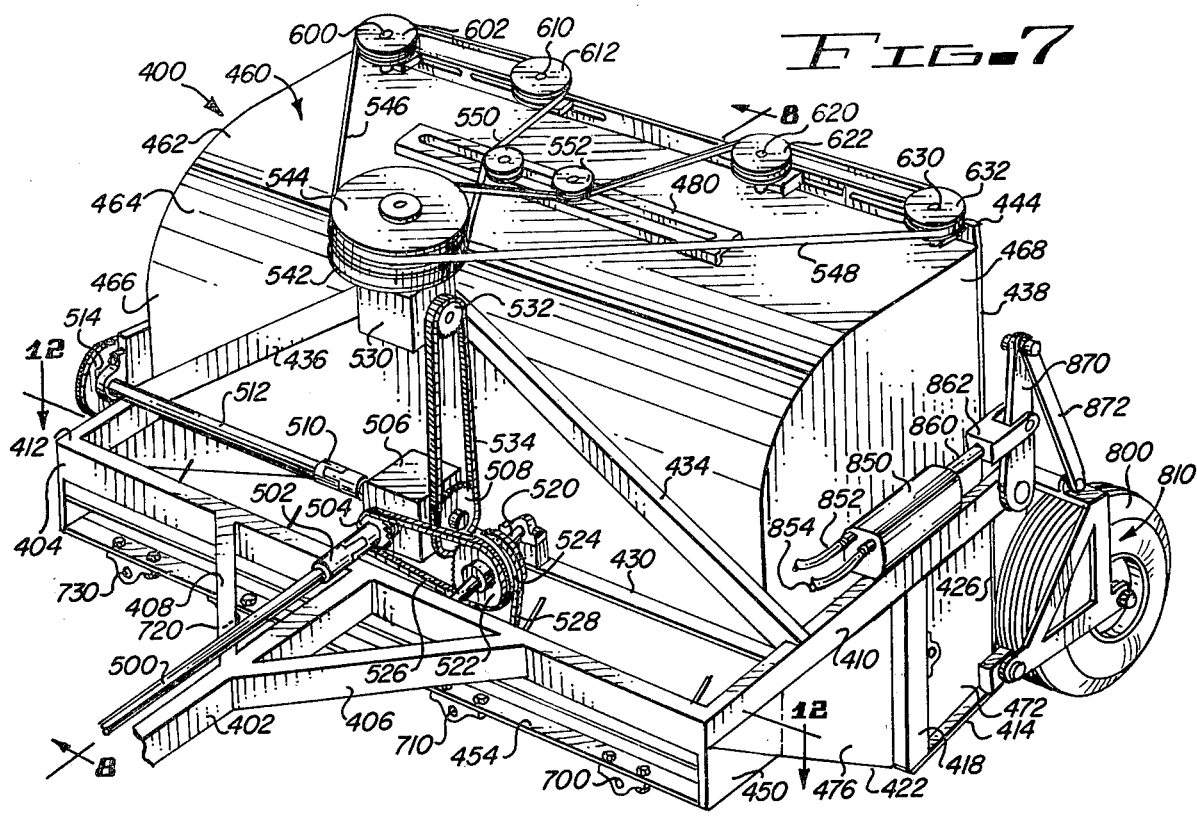
FIG. 7 is a perspective view of an alternate embodiment of the apparatus of the present invention.
Figures 8, 12:
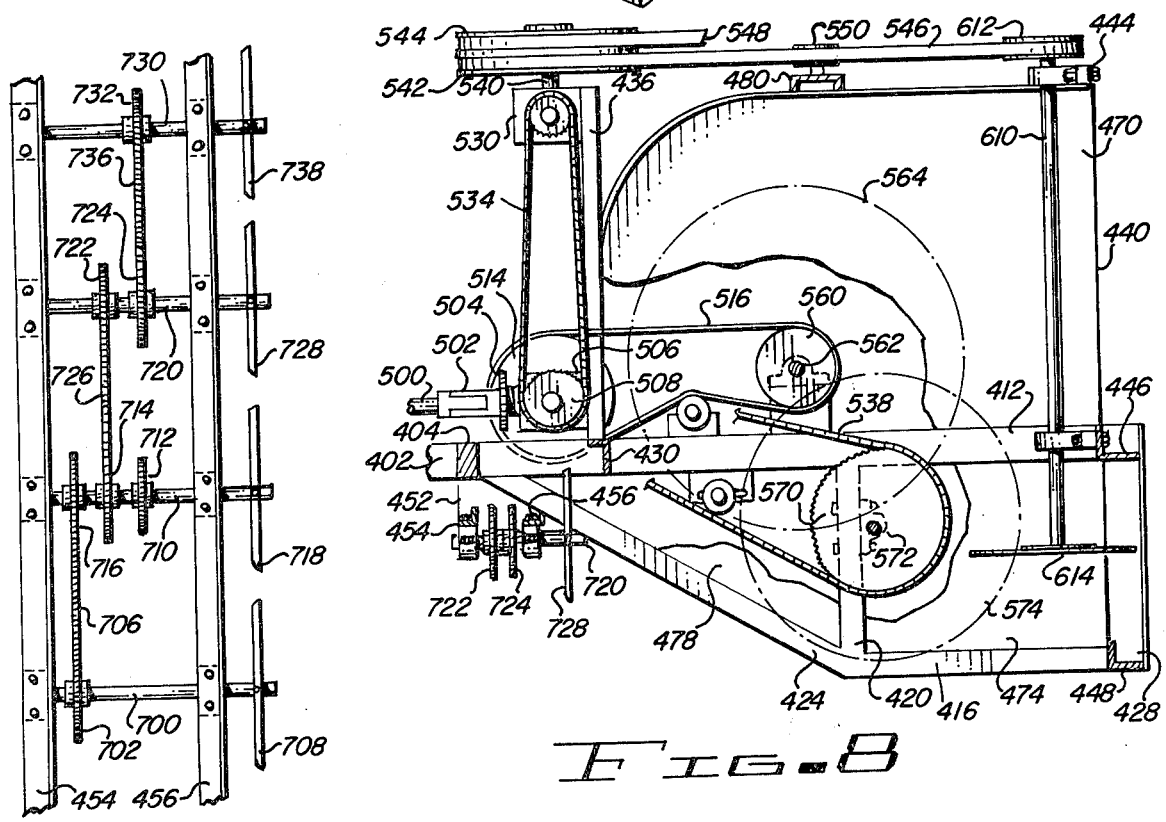
FIG. 8 is a view in partial section of the apparatus of FIG. 7 taken generally along line 8—8 of FIG. 7.
FIG. 12 is a top view of a portion of the apparatus of FIG. 7 taken generally on line 12—12 of FIG. 7.

FIG. 7 is a perspective view of an alternate embodiment of the onion topping apparatus of the present invention. FIG. 8 is a view in partial section of the apparatus of FIG. 7 taken generally along line 8—8 of FIG. 7. FIG. 9 is a top view of the apparatus of FIG. 7. All three figures, FIGS. 7, 8, and 9, will be discussed together, and reference to all three will be necessary for an understanding of the following discussion and explanation. In addition, where necessary, a specific figure may be referred to, as required. The alternate embodiment, designated generally by reference numeral 400, includes the features of the embodiment of FIGS. 1-6, namely rotating lifting fingers, rotating positioning fingers disposed rearwardly of the lifting fingers, horizontally rotating cutter blades disposed rearwardly of the positioning fingers, and rotating cleaning blades or high speed knives disposed above the positioning fingers and rotating at a high speed to clean the onion tops from the positioning fingers. In both embodiments, while the cutter blades rotate generally horizontally, the lifting fingers, the positioning fingers, and the high speed cleaning blades all rotate generally vertically. In the alternate embodiment, the positioning fingers and the cleaning knives rotate generally parallel to the line of travel of the apparatus, which is parallel to or along an onion bed, while the lifting fingers rotate in a vertical plane generally perpendicular to the direction of rotation of the positioning fingers and the cleaning blades, or generally perpendicular to the onion bed and to the direction of travel of the apparatus.

The onion topping apparatus 400 includes a frame which is generally composed of structural steel members, typically angle iron or channel iron, and an enclosure which comprises a housing for the positioning fingers, the cleaning knives or blades, and the cutter blades. The lifting fingers, at the forward portion of the apparatus 400, are somewhat enclosed by the frame of the apparatus, but are also partially exposed. That is, they are not disposed within the enclosure, generally denoted by reference numeral 460, but they are within the framework of the apparatus.

As has been stated, both with respect to the embodiment of FIGS. 1-6, and the alternate embodiment disclosed in FIGS. 7-14, structural members are made of either channel iron or angle iron, as appropriate. The various structural members will hereinafter not be generally identified specifically as a channel member or as an angle iron member, but will simply be referred to as a structural member or structural element. Moreover, it is obvious that various designs of structural members, enclosures, and the like may be used for the apparatus of the present invention. Hence, the description of the embodiments disclosed in this application are illustrative only and are simplified for reasons of clarity. The various structural members and the enclosure may be secured together by any appropriate means. Typically, the various members will be welded together, with various portions or elements bolted to the framework of the enclosure. However, any appropriate fastening means, such as are well known in the art, may be used. Accordingly, the term "secured" will simply be used hereafter and given its broadest meaning in conjunction with the apparatus. Also, rotating members generally require some type of bearings, and in most cases in this application bearings or pillow blocks or the like are not specifically set forth, since they are well known and understood.

The alternate embodiment 400 of the apparatus of the present invention includes a tongue member 402 which extends generally forwardly from the structural frame of the apparatus and is used as a draw bar to be secured to a tractor, or the like. The tongue is secured to a front cross frame member 404, and a pair of braces 406 and 408 extend diagonally between the front cross member 404 and the tongue 402 and are secured to both. Extending rearwardly from the front cross frame member 404 at substantially a right angle to the front cross frame member are a pair of side frame members 410 and 412. The side frame members are generally parallel to each other. Extending substantially parallel to the side members 410 and 412 are a pair of lower frame members 414 and 416 (see FIG. 2). The lower frame members 414 and 416 are only about half the overall length of the side frames members 410 and 412, and are disposed at the rear of the apparatus. A pair of intermediate vertical frame members 418 and 420 extend between the frame members 410 and 414, and the members 412 and 416, respectively. A pair of lower front diagonal frame members 422 and 424 extend upwardly and forwardly between the lower portion of the intermediate vertical frame members 414 and 420 to the front cross frame member 404. At the rear of the frame, and extending vertically between the frame members 410 and 414 is a lower rear vertical frame member 426, illustrated in FIG. 7 while a lower rear vertical frame member 428 is illustrated as extending between frame member 412 and 416 in FIG. 8. The frame members 418 and 426 are substantially parallel, as are the vertical frame members 420 and 428.

Extending upwardly from the side frame members 410 and 412 are a pair of rear upper vertical frame members 438 and 440, respectively. The rear upper vertical frame members 438 and 440 are secured to a rear upper cross frame member 444.

Another pair of rear cross frame members 446 and 448 are illustrated in FIG. 8 as extending substantially parallel to each between the frame members 410 and 412 and the frame members 414 and 416, respectively.

An intermediate cross frame member 430 extends between the side frame members 410 and 412 substantially parallel to, and spaced apart slightly from, the front cross member 404. The cross member 430 is generally parallel to, and in the same plane with, the rear cross frame member 446. From about the juncture of the intermediate cross frame member 446. From about the juncture of the intermediate cross frame member 430 with the side frame members 410 and 412, a pair of front diagonal frame members 434 and 436 extend upwardly and are secured together at the upper portion of the apparatus, and at about the mid point of the apparatus, a widthwise.

A pair of plates 450 and 452 are secured to the side frame members 410 and 412, respectively, and extend downwardly from the cross members. The plates are secured to the cross members adjacent the front cross frame member 404. At the bottom portion of the plates are secured a pair of cross frame members 454 and 456, comprising, respectively, the front lower cross member and the front lower rear cross member, which are parallel to each other, and are used to support the axles or shafts and bearings for the lifting fingers, as discussed below.

The enclosure 460 comprises sheet metal generally secured to the various frame members, as by welding. The enclosure 460 includes a top 462 which extends forwardly from the rear of the apparatus from the rear upper cross frame member 444. The top portion 462 of the enclosure is generally parallel to the ground over which the apparatus is disposed, and generally parallel to the longitudinal axis of the frame members 410 and 412.

A curved section, defined as intermediate curved section 464, extends between the top 462 and a front portion 466. The front portion 466 extends upwardly from the intermediate cross frame member 430 and substantially perpendicular to the top 462. The curved intermediate portion 464 defines a transition area between the top 462 and the front 466.

The sides of the enclosure include a pair of upper sides 468 and 470, which extend upwardly from the side members 410 and 412, respectively, and forwardly from the rear upper vertical frame members 438 and 440, respectively, to the top 462, the intermediate curved portion 464, and the front 466, of the enclosure 460. Beneath the side panels 468 and 470 are a pair of generally rectangular lower rear side panels 472 and 474. The side panel 472 extends between the side frame member 410 and the lower frame member 414, and also between the intermediate vertical frame member 418 and the rear vertical frame member 426. Similarly, the lower rear side panel 474 extends between the side frame member 412 and the lower frame member 416, and between the intermediate vertical frame member 420 and the rear vertical frame member 428.

Forwardly of the lower rear side panels 472 and 474 are a pair of triangular side panels 476 and 478. The panel 476 is secured to and between the side frame member 410, the intermediate vertical frame member 418, and the lower front diagonal frame member 422. The lower front side panel 478 is secured to and between the side frame member 412, the intermediate vertical frame member 420, and the lower front diagonal frame member 424.

A power takeoff shaft 500 is disposed above, and substantially parallel, to the tongue 402. The power take-off shaft 500 is coupled through a universal joint 502 to a transmission within a transmission housing 506. A sprocket 504 is secured to a shaft at the universal joint 502 adjacent the transmission within the transmission housing 506.

From one side of the transmission housing 506 extends a shaft to which is secured a sprocket 508. At the opposite side of the transmission housing 506 from the sprocket 508 is a universal joint 510 which is coupled to a shaft 512. The shaft 512 is appropriately journaled for rotation at the side frame member 412, and at its distal end, remote from the transmission within the housing 506, is a sprocket 514.

A shaft 520 is secured to, and journaled for rotation on, the intermediate cross member 430. The shaft 520 has a pair of sprockets secured thereto, including a sprocket 522 and a sprocket 524. A chain 526 extends from the sprocket 504 to the sprocket 522 and provides power direct drom the power takeoff shaft 500 through the universal joint 502 to the shaft 520. A chain 528 extends about the sprocket 524 downwardly to provide, ultimately, the power for driving the rotating lifting fingers, as explained below.

A second transmission housing 530 is disposed above the transmission housing 506 and secured to the front diagonal frame members 434 and 436. The transmission within the housing 530 is coupled to the transmission within the housing 506 by a chain 534 which extends between the sprocket 508 and a sprocket 532. The sprockets are secured to shafts extending outwardly from, and appropriately secured to, transmissions within the housings 506 and 530, respectively.

Disposed in a horizontal orientation above the transmission housing 530 is a pair of pulleys or sheaves secured to a shaft 540 (see FIG. 8). The pair of sheaves include a lower sheave 542 and an upper sheave 544. A belt is disposed around each of the two sheaves for driving each a pair of cutter blades. A belt 546 extends about the lower sheave 542 and around a pair of drive pulleys 602 and 612, which pulleys are secured respectively to a drive shaft 600 and a drive shaft 610. The belt 546 also extends about an idler pulley 550, which is adjustably secured to a bracket 480. The bracket 480 is disposed on, and secured to, the top 462 of the enclosure 460. The bracket 480 is preferably a channel iron with a pair of longitudinally extending slots, one of each of which receives the idler pulley 550 and another idler pulley 552. The bracket 480 is disposed substantially parallel to the rear upper cross frame member 444, and centrally with respect to the width of the apparatus, or evenly between the sides 468 and 470.

Another belt, belt 548, extends around the sheave 544 and also around the idler pulley 552, also disposed on the bracket 480, and around a pair of drive pulleys 622 and 632, secured respectively to a pair of drive shafts 620 and 630.

The drive shafts 600, 610, 620, and 630 are journaled for rotation in appropriate bearings secured to the rear upper cross frame member 444 and/or the top 462 of the enclosure 460. The drive shafts are also journaled for rotation at their lower end remote from their respective pulleys, by a plurality of bearings secured to the middle rear cross frame member 446, as shown in FIG. 8.

Referring primarily to FIG. 8, it will be seen that a portion of the side panels 470, 474, and 478 have been broken away to show the chain and sprocket drive systems associated with the positioning fingers and the high speed cleaning knives. In FIG. 7, the shaft 512 is shown coupled to a sprocket 514. The sprocket 514 is also shown in FIG. 8. A chain 516 is disposed about the sprocket 514 and it extends to a sprocket 560 which is journaled for rotation above, and secured ultimately to, the side frame member 412. The sprocket 560 is in turn secured to a shaft 562, to which shaft are secured high speed cleaning knives, similar to the knives disclosed above in conjunctinn with FIGS. 1-6. The chain 516 also extends about an appropriate idler sprocket, also secured to the cross member 412. A circle 564 is shown concentrically disposed about the pulley 560. The circle 564 represents the tip path of the high speed cleaning knives which are secured to the shaft 562.

Not shown in either FIGS. 7 or 8, but shown in FIG. 9, is another sprocket 536, also secured to the shaft 512, coaxially with the sprocket 514. A chin 538 extends about the sprocket 536 and also about another sprocket 570, which is appropriately secured to and journaled for rotation on, the intermediate vertical frame member 420, as shown in FIG. 8. The chain 538 also extends about an appropriate idler sprocket shown secured to the side frame member 412. A circle 574 is shown extending concentrically about the sprocket 570, and also the shaft 572, and represents the tip path of th positioning fingers used to position the tops of onions preparatory to their being cut by the rotating cutter blades. It will be noted that the circles 564 and 574 overlap each other. It is, of course, the purpose of the high speed cleaning knives to rotate adjacent the positioning fingers to clean the onion tops from the positioning fingers. It will also be noted that the tip path of the positioning fingers illustrated by the circle 574 also overlaps with the circular path of a cutter blade 614 shown secured to the bottom of lower portion of the shaft 612 in FIG. 8. The apparent overlapping of the blade 614 and the positioning fingers will be explained below in conjunction with FIGS. 13, 14, and 15.

With respect to FIGS. 7, 8, and 9, the illustrations of the pulleys and chains, and of the tip paths of the rotating members, are all illustrative only and therefore are a schematic representation of the actual apparatus rather than a scaled version of the apparatus which they represent. Accordingly, no inference should be drawn from the arithmetic or geometric ratios indicated schematically by the various components or elements illustrated herein. This same thing may be stated with respect to the other figures in this application, as has been indicated above in conjunction with the embodiments of FIGS. 1-6. Moreover, other drive means may be used in place of the sprockets and chains or pulleys and belts shown herein, and correspondingly appropriate idler apparatus, as required, may be used.

Beneath the cross frame member 404, and secured to the front lower cross frame members 454 and 456, and rotatably journaled thereon, are four shafts 700, 710, 720, and 730. The shafts each include appropriate sprockets and chains to connect them to each other, and ultimately to shaft 520, which is driven from power takeoff shaft 500, to provide rotation for lifting fingers which lift and fluff the onion tops prior to the onion tops being picked up by the lifting fingers and held for cutting by the rotating cutter blades. As shown in FIG. 7, the shaft 520 is appropriately journaled for rotation on the front intermediate cross member 430. The shaft 520 has secured to it a pair of sprockets 522 and 524. The sprocket 522 is coupled through a chain 526 to the sprocket 504 which is in turn secured to the power takeoff shaft 500. The sprocket 524 is coupled by a chain 528 to a sprocket on shaft 710. The shaft 710 in turn becomes the driving shaft for driving the shafts 700, 720, and 730.

Shaft 700 is coupled to shaft 710 by a pair of sprockets 702 and 712 secured respectively to the shafts 700 and 710, through a chain 706. Lifting fingers 708 are shown secured to one end of the shaft 700.

Shaft 710 is coupled to shaft 720 by means of a chain 726 extending between a sprocket 714 secured to the shaft 710, and a sprocket 722 secured to the shaft 720. The shafts 720 and 730 are respectively coupled together by a chain 734 which extends between a pair of sprockets 724 and 732 secured respectively to the shafts 720 and 730. A portion of the lifting fingers 718 secured to the shaft 710 are shown in FIG. 9. The arrangement of the shafts, sprockets and chains are clearly shown in FIG. 12.

The lifting fingers rotate adjacent the housing 460 of the apparatus. The lifting fingers rotate in a vertical plane substantially perpendicular to the direction of travel of the apparatus. And, as may be clearly seen from FIG. 8, the rotating members of the onion topping apparatus 400 of FIGS. 7-15 rotate in planes mutually perpendicular to each other. The lifting fingers, such as lifting fingers 708 and 718 shown in FIG. 9, and lifting fingers 728 shown in FIG. 8, rotate in a plane substantially perpendicular to the plane of the ground over which the apparatus is pulled and also in a plane substantially perpendicular to the direction of travel of the apparatus. The rotating high speed cutter blade and the rotating positioning fingers, respectively indicated by the circles 564 and 574 of FIG. 8, rotate in a plane substantially perpendicular to the ground over which the apparatus is moving and parallel to the direction of travel of the apparatus. The rotating cutter blades, such as the cutter blade 614 of FIG. 8, rotate in a plane substantially parallel to the ground over which the apparatus is pulled. (See also FIG. 9).

The shaft 720 as shown in FIG. 8 is secured to the frame members 454 and 456, and includes the pulleys 722 and 724, as discussed above. The shaft 720 includes lifting fingers 728 secured thereto. The lifting fingers, such as 708, 718, and 728, illustrated in FIGS. 9 and 8, are substantially identical to the lifting fingers described previously with respect to the embodiment of FIGS. 1-6. They are preferably four flexible fingers extending radially outwardly from a hub secured to their respective shafts and each is disposed at about ninety degrees from the adjacent fingers on each hub.

The onion topping apparatus 400 includes a pair of wheels 800 and 802 secured to the lower rear portion of the apparatus. (See FIGS. 7 and 8.) Each wheel is rotatably secured to a wheel frame which is in turn pivotally secured to the frame of the apparatus. As indicated in FIG. 7, the wheel 800 is rotatably secured to an appropriate axle which is in turn secured to a wheel frame 810. The frame 810 is pivotally secured to frame members 414 and 426 by an appropriate bolt or pin which extends through the wheel frame 810 to allow the wheel frame to pivot on the frame of the apparatus.

The pivoting of the wheel frame is accomplished by means of a hydraulic actuator 850 shown secured to the side frame member 410. A pair of hydraulic lines 852 and 854 extend to the actuator 850. A piston rod or actuating rod 860 extends out of the actuator and is coupled to a Y-shaped hyoke 862 which is pinned to a link 870. The actuator 850 is pivotally secured to the side frame member 410, and thus relative motion is allowed between the frame and the hydraulic actuator, and between the hydraulic actuator piston or actuator rod 816 and the link 870. The link 870 is in turn pivotally secured to the frame member 410. The opposite end of link 870 from that secured to the frame member 410 is pivotally secured to another link 872. The link 872 is in turn pivotally secured to the wheel frame 810. The yoke 862 is secured to the link 870 intermediate the two ends of the link. As the piston or actuator rod 860 is retracted into the actuator 850 in response to appropriate hydraulic pressure through the lines 852 and 854, the link 870 is moved upwardly on its pivot point about the frame member 410, which in turn moves the link 872 secured to the wheel frame 810 upwardly. With the link 870 pivoting upwardly with respect to the frame, the link 872 also moves upwardly which allows the wheel frame 810 with the wheel 800 secured thereto, to also move upwardly. This in turn causes the frame of the apparatus to move downwardly to position the cutter blades closer to the ground.

Only one hydraulic actuator is required to move both wheels. The wheel frames for both wheels 800 and 802 pivot on the apparatus frame, and the mechanical linkage for both wheels moves parallel to each other. The wheel 802 includes a wheel frame 820, which is substantially identical to the wheel frame 810. A link 882 is secured at one end to the wheel frame and at its other end to another link 880. The link 880 is in turn secured to a rod 840 which extends transversely across the back or rear portion of the onion topping apparatus 400. The rod 400 is appropriately supported for rotation on the frame of the apparatus. The link 870 is also secured to the rod 840. Movement of the link 870 as it pivots on the frame of the apparatus results in rotary movement or motion of the rod 840 and the rotary motion of the rod 840 is in turn imparted to the link 880 and a resulting pivoting movement of the link 880 occurs. Movement of link 880 results in movement of the wheel 802 through the link 882 and the wheel frame 820. Accordingly, there is parallel movement between the wheels 800 and 802 to raise and lower the frame of the apparatus with respect to the ground, and onion beds therein, over which the apparatus moves.

FIGS. 10 and 11 are enlarged side views of the wheel 800, its wheel frame 810, and the mechanical linkage securing the wheel frame 810 to the hydraulic actuator 850. The views sequentially illustrate the movement of wheel 800 from about its midpoint position with respect to its travel, in FIG. 10, to its full down position, in FIG. 11.

In FIG. 10, the wheel frame 810 is shown as having from the side a generally triangular configuration. The bottom of the frame 810 is pivotally secured to the frame of the onion topping apparatus, while the top of the frame 810 is pivotally secured to the link 872. The link 872 is in turn pivotally secured to one end of the link 870. The other or opposite end of the link 870 is secured to the rod 840, and accordingly movement of the link 870 results in a corresponding movement of the rod 840. The rod 840 is supported by, and is rotatably journaled in, a plate 411 secured to the side frame member 410. Between the coupling of the link 870 to the rod 840 and the juncture of the link 870 and the link 872 is a forwardly extending tab 871, to which is secured the yoke 862. The yoke 862 is secured to the tab 871 by an appropriate pin, or the like. The yoke 862 is, as discussed above, secured to the piston or actuator rod 860 of the hydraulic actuator 850.

Appropriate hydraulic pressure within the actuator 850 causes the rod 860 to move outwardly, thus causing the link 870 to pivot on the frame of the apparatus about its pivot point, which is about the rod 840 on the plate 411. The outward movement of the rod 860 results in rearwardly movement of the link 870, which causes the outer end of the link 870, the end to which is secured the link 872, to describe a downward and rearward arc. This arcuate movement also results in a pivoting of the hydraulic actuator 850 on the frame of the apparatus. The end of the link 872 secured to the wheel frame 810 accordingly moves downwardly, resulting in a downward movement of the wheel 800 as the wheel frame 810 pivots on the frame of the apparatus. The downward movement of the wheel results in an upward movement of the frame of the apparatus, thus raising the apparatus, and the cutter blades, relative to the ground and the onion beds over which the apparatus is disposed and over which it moves.

The sequential movement of the links 870 and 872, and the resulting movement of the wheel 800 and the wheel frame 810 is shown in FIG. 11. The wheel 800 is shown at about its full down position in FIG. 11, which means that the onion topping apparatus is at its highest position relative to the ground. In the position shown in FIG. 11, the piston or actuator rod 860 is in its full out position with respect to the actuator 850.

FIG. 12 is a top view of a portion of the apparatus of FIG. 9 taken generally along line 12—12 of FIG. 9, and showing the orientation of the shafts, sprockets, and chains used for the rotating lifting and fluffing fingers.

The shafts 700, 710, 720, and 730 are respectively secured to, and journaled for rotation on, the frame members 454 and 456, preferably below the frame members, as shown in FIG. 7. Shaft 710 is the driving shaft, directly for shafts 700 and 720, and, through shaft 720, also for shaft 730. Sprocket 712 on shaft 710 is connected by a chain to pulley 724 on shaft 520, as shown in FIGS. 7 and 9, to provide power for rotating all four shafts. The lifting fingers 718 are secured to the shaft 710 and rotate therewith.

The chain 706 extends between sprockets 702 and 716 to drive shaft 700 by rotation of shaft 710, to rotate lifting fingers 708 secured to the shaft 700. The chain 726 extends between sprockets 714 and 722 on shafts 710 and 720, respectively, to rotate lifting fingers 728 secured to the shaft 720. The chain 736 extends between sprockets 724 and 732 on shafts 720 and 730, respectively, to rotate lifting fingers 738 secured to the shaft 730.

The shafts 700, 710, 720, and 730 are shown in FIG. 12 as parallel, and of equal length, with the lifting fingers 708, 718, 728 and 738 respectively secured to the shafts aligned with each other. It may be preferable to have the lifting fingers staggered on the shafts so as to allow for the overlapping of the lifting fingers.

FIG. 13 is a perspective view, somewhat enlarged, of a portion of the apparatus of the present invention, comprising a view of a portion of the shaft 572 (see FIG. 8) and of two pairs of curved positioning fingers 584, 586 and 594, 596 secured to the shaft 572. It will be noted that the cross sectional configuration of the shaft 572 is square, rather than circular. The positioning fingers 584, 586 and 594, 596 extend radially outwardly from a pair of hubs 580 and 590, respectively. The positioning fingers are slightly curved and, as opposed to the lifting fingers, as described above, are not flexible, but rather are rigid, preferably made of steel. The hubs each include an internal bore with a square configuration to receive the shaft 572. The hubs are movable on the shaft and are secured to the shaft by a pair of thumb screws 582 and 592, respectively, extending radially inwardly of the hubs 580 and 590. While the exterior configuration of the hubs 580 and 590 is shown as circular, with a square bore to match the square shaft 572, the exterior configuration may also be square. The square configuration of the shaft prevents the hubs from rotating relative to the shaft.

Each hub includes only a pair of lifting fingers which extend diametrically oppositely to each other from the hub. Thus the hub 580 includes a pair of lifting fingers 584 and 586, while the hub 590 includes a pair of lifting fingers 594 and 596. As the two hubs are secured to the shaft 572, the pair of lifting fingers from each hub are staggered substantially perpendicular to the lifting fingers of each adjacent hub. The reason for this is simply that having the adjacent fingers disposed at ninety degrees to each other (or perpendicular) rather than parallel prevents rocks or stones or the like from being picked up by an adjacent pair of positioning fingers. The inability of the positioning fingers to pick up and lift rocks or the like prevents damage to the high speed cleaning knives or blades which rotate adjacent to, and between, the fingers, as indicated above and also as illustrated below in FIGS. 14 and 15. If the positioning fingers were oriented parallel to each other, debris such as rocks could be picked up and held by the positioning fingers and could then be contacted by the high speed cleaning knives and damage to the knives could accordingly result.

It will be noted that the positioning fingers 584 and 586 secured to the hub 580 are longer than the positioning fingers secured to the hub 590. The difference in the length of the fingers is explained by reference to FIGS. 14 and 15, where it is shown that the shorter positioning fingers are disposed adjacent the cutter blades, while the longer positioning fingers are positioned outwardly from and between the cutter blades. This also explains the overlapping circle 574 in FIG. 8 with respect to the cutter blade 614. The circle 574 represents the tip path of the longer positioning fingers, which rotate laterally or between the cutter blades.

The use of a square shaft as illustrated in FIG. 12 for the positioning fingers is also advantageous with respect to shaft 562 for the rotating cleaning blades. The use of such square shaft permits the use of movable hubs to which the high speed cleaning blades are secured, such as the hubs shown in FIGS. 13, so that the high speed cleaning knives may be moved laterally with respect to the apparatus, or longitudinally with respect to the shaft 562, to position the blades as desired with respect to the positioning fingers. In other words, if or when the positioning fingers are adjusted, a corresponding adjustment may be made to the high speed cleaning knives.

FIG. 14 is a schematic representation of the apparatus of FIGS. 7-12, illustrating the orientation of the shafts 562 and 572, with their high speed cleaning blades or knives and positioning fingers, respectively, with respect to the rotating cutter blades. A circle is described about each of the four shafts 600, 610, 620, and 630, and the circles represent the path of the tip of the cutter blades secured to the respective shafts.

FIG. 14 is a schematic representation only, and accordingly the high speed cleaning knives secured to shaft 562 are illustrated as extending in one direction only from the shaft, and the positioning fingers are shown in a substantial parallel relationship with respect to their shaft 572. However, this schematic representation is only for illustrative purposes, to describe the interleaving relationship between the cleaning knives or blades and the positioning fingers, and the location of the longer positioning fingers, such as positioning finger 584, with respect to the shorter lifting fingers, such as lifting fingers 594, and the path of the cutter blades. The orientation of the high speed cleaning knives with respect to their shaft 562 is preferably as illustrated above, for example in conjunction with FIGS. 5 and 6, with a single blade extending radially outwardly from its hub on the shaft, and adjacent blades being disposed 180 degrees apart. The orientation of the positioning fingers with respect to their shaft 572 is preferably as illustrated in FIG. 13, with adjacent hubs having their fingers rotated ninety degrees to each other.

FIG. 15 is a schematic rear view of the apparatus of FIGS. 7-13 showing a portion of the apparatus disposed over a pair of onion beds 902 and 904, which together comprise a single double onion bed. A wheel 800 at the rear of the onion topping apparatus is illustrated as extending into a relatively deep furrow 906 on one side of the onion bed 902. Two shafts 620 and 630, with their cutter blades 624 and 634 are shown disposed over onions in parallel rows in the beds. The onion beds include a short furrow 908 between the beds of onions. Two rows of onions are shown in each single bed of onions adjacent a relatively shallow furrow 908. Another wheel 801 is shown extending into another deep furrow 910. The wheel 801 may be one of the wheels from a tractor, such as the front wheel of a tractor.

In the embodiment of the apparatus in FIGS. 7-9, four cutter blades are shown extending over what would be two double onion beds, each of which includes two single beds, each of two rows of onions. Accordingly, the wheels of the tractor and the onion topping apparatus which it pulls conform to the configuration of the beds and furrows. Or, in actuality, the configuration and spacing of the furrows and the onion beds conforms to the spacing and dimensions of the tractors and the onion topping apparatus. In FIG. 15, only one half of the apparatus is schematically illustrated.

The shaft 562 which carries the high speed cleaning knives is shown with the proper orientation of the blades secured to the shaft. As indicated above in conjunction with FIGS. 13 and 14, each blade is secured to a movable hub, and the shaft 562 is preferably square to prevent the movement of the blades angularly with respect to the shaft. However, the blades may be moved laterally with respect to the apparatus, or longitudinally with respect to the shaft 562, to be located as desired with respect to the positioning fingers secured to the shaft 572.

The location or position of each of the short positioning fingers, such as finger 594, with respect to the cutter blades and to the longer positioning fingers, such as positioning fingers 584, is clearly shown in FIG. 15. The positioning fingers 584, being substantially larger than the positioning fingers 594, are located outboard of the rotating cutter blades, such as the blades 624 and 634 secured respectively to the shafts 620 and 630. The longer positioning fingers extend below the top of each onion bed into the furrows and thus pick up the tops of the onions that may be lying in the furrows on either side of the onion beds. In this way the onion tops are uniformly positioned for cutting, regardless of where they may be or the direction in which they may be lying with respect to the onions in the beds. The shorter positioning fingers are disposed with respect to the shaft 572 so that they are adjacent the cutter blades but will not, of course, overlap into the circular pathway of the cutter blades. Accordingly, the rotating positioning fingers achieve maximum efficiency with respect to picking up and positioning the onion tops for cutting by the rotating cutter blades. Similarly, the high speed cleaning knives are positioned so as to most effectively and efficiently cut the tops away from the positioning fingers.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Apparatus for cutting tops from onions in an onion bed, comprising, in combination:
   frame means movable over an onion bed;
   rotating lifting means secured to the frame means for lifting onion tops, and including
   rotating lifting fingers for lifting and fluffing the onion tops from the onion beds, and
   rotating positioning fingers for positioning the onion tops for cutting;
   blade means secured to the frame means for cutting the onion tops lifted and positioned by the rotating lifting fingers and rotating positioning fingers of the rotating lifting means; and
   cleaning means for cleaning the rotating positioning fingers.

2. The apparatus of claim 1 in which the cleaning means for cleaning the positioning fingers comprises cleaning blades adjacent the positioning fingers.

3. The apparatus of claim 2 in which the cleaning blades rotate adjacent the positioning fingers.

4. The apparatus of claim 3 in which the positioning fingers include a curved portion.

5. The apparatus of claim 2 in which the lifting means are rotatable generally parallel to each other.

6. The apparatus of claim 5 in which the blade means comprises a blade rotatable adjacent the positioning fingers.

7. The apparatus of claim 6 in which the blade means rotates in a generally horizontal plane.

8. The apparatus of claim 7 in which the rotating lifting means rotates in a plane which is generally perpendicular to the plane in which the blade means rotates.

9. The apparatus of claim 8 in which the frame means includes a floating frame for supporting the lifting means, the cleaning means, and the blade means.

10. The apparatus of claim 9 in which the frame means further includes a fixed frame movably secured to the floating frame, and the floating frame is disposed within and movable relative to the fixed frame.

11. The apparatus of claim 10 in which the frame means includes means for adjusting the height of the blade means with respect to the onion bed.

12. The apparatus of claim 11 in which the means for adjusting the height of the blade means includes an adjustable roller secured to the floating frame.

13. The apparatus of claim 12 in which the frame means further includes spring means secured to and extending between the fixed frame and the floating frame.

14. The apparatus of claim 13 in which the frame means further includes a plurality of parallel arms secured to and extending between the fixed frame and the floating frame.

15. The apparatus of claim 14 in which the floating frame includes a front end and a rear end and the adjustable roller is disposed at the rear end for adjusting the height of the blade means above the onion bed.

16. Onion topping apparatus for cutting the tops of onions, comprising, in combination:
   frame means movable over an onion bed;
   rotating finger means secured to the frame means for positioning the onion tops for cutting and for removing the cut onion tops;
   cutter blade means secured to the frame means and movable to cut the onion tops positioned by the finger means; and
   knife means interleaved with and rotatable adjacent the finger means to clean the finger means.

17. The apparatus of claim 16 in which the frame means includes first and second frame means, and the first frame means is secured to the second frame means by a plurality of parallel arms pivotally secured to the first frame means and to the second frame means.

18. The apparatus of claim 17 in which the first frame means is further secured to the second frame means by spring means extending between the first and the second frame means.

19. The apparatus of claim 18 in which the second frame means includes a vertically adjustable roller for positioning the second frame means over the onion bed.

20. The apparatus of claim 19 in which the first frame means is further secured to the second frame means by a plurality of movable parallel arms.

21. The apparatus of claim 16 in which the rotating finger means includes a plurality of rotating positioning fingers spaced apart from the rotating lifting fingers for positioning the tops for cutting by the cutter blade means.

22. The apparatus of claim 21 in which the rotating finger means further includes a plurality of rotating lifting fingers spaced apart from the rotating positioning fingers for lifting the onion tops.

23. The apparatus of claim 21 in which the rotating finger means further includes cleaning blade means adjacent the positioning fingers for cleaning the positioning fingers.

24. The apparatus of claim 23 in which the finger means are rotatable generally parallel to each other.

25. The apparatus of claim 24 in which the cutter blade means rotates substantially horizontally and the finger means rotate generally vertically.

26. Apparatus for cutting tops from onions in onion beds, comprising, in combination:
fixed frame means movable over an onion bed;
a first and a second floating frame disposed within and independently secured to the fixed frame means and independently movable with respect to the fixed frame means and to each other;
rotating lifting means secured to each floating frame for lifting the onion tops;
rotating positioning means secured to each floating frame rearwardly of the lifting means for positioning the onion tops for cutting; and
means for cutting the lifted and positioned onion tops.

27. The apparatus of claim 26 in which each floating frame includes a first set and a second set of lifting fingers, a first and a second set of positioning fingers, and a first and a second set of blades, end each set rotates on its own shaft.

28. The apparatus of claim 27 in which the respective first sets and second sets for each floating frame are disposed at an obtuse angle to each other.

29. Apparatus for cutting onion tops in an onion bed, comprising, in combination:
frame means movable over an onion bed;
rotating positioning means secured to the frame means and rotatable to position onion tops for cutting;
blade means secured to the frame means and disposed adjacent the positioning means for cutting the onion tops;
rotating cleaning means disposed adjacent the positioning means for cleaning the positioning means.

30. The apparatus of claim 29 in which the positioning means includes a plurality of curved positioning fingers spaced apart from each other secured to a rotatable shaft for positioning the onion tops for cutting by the blade means.

31. The apparatus of claim 30 in which the blade means includes a blade rotatable adjacent the positioning means.

32. The apparatus of claim 31 in which the cleaning means includes a plurality of blades rotatable on a shaft adjacent the curved fingers of the positioning means for cleaning cut onion tops from the curved fingers.

33. The apparatus of claim 32 in which the positioning means and the cleaning means include hubs to which the fingers and blades are secured and the hubs are movable on the shafts to which they are respectively secured.

34. The apparatus of claim 32 in which the positioning means further includes a plurality of rotating lifting fingers for lifting and fluffing the onion tops prior to the positioning of the onion tops by the positioning fingers.

* * * * *